(12) United States Patent
Magoon et al.

(10) Patent No.: US 8,684,705 B2
(45) Date of Patent: Apr. 1, 2014

(54) METHOD AND SYSTEM FOR CONTROLLING OPERATION OF A PUMP BASED ON FILTER INFORMATION IN A FILTER INFORMATION TAG

(75) Inventors: Paul J. Magoon, Merrimack, NH (US); Raul A. Ramirez, Burlington, MA (US); Traci L. Batchelder, Billerica, MA (US)

(73) Assignee: Entegris, Inc., Billerica, MA (US)

( * ) Notice: Subject to any disclaimer, the term of this patent is extended or adjusted under 35 U.S.C. 154(b) by 347 days.

(21) Appl. No.: 12/714,126

(22) Filed: Feb. 26, 2010

(65) Prior Publication Data

US 2011/0211975 A1 Sep. 1, 2011

(51) Int. Cl.
- *G05B 19/43* (2006.01)
- *F04B 39/16* (2006.01)
- *F04B 53/20* (2006.01)
- *B01D 35/00* (2006.01)

(52) U.S. Cl.
USPC ............. 417/313; 417/53; 210/739; 700/273; 700/282

(58) Field of Classification Search
USPC ............. 417/53, 313; 210/85, 91, 141, 416.1, 210/739, 767; 700/273, 282
See application file for complete search history.

(56) References Cited

U.S. PATENT DOCUMENTS

| | | |
|---|---|---|
| 3,660,200 A | 5/1972 | Anderson et al. |
| 4,605,591 A | 8/1986 | Nose et al. |
| 4,699,298 A | 10/1987 | Grant et al. |
| 4,827,110 A | 5/1989 | Rossi et al. |
| 4,891,254 A | 1/1990 | Bianco |
| 4,965,933 A | 10/1990 | Mraz et al. |
| 5,108,015 A | 4/1992 | Rauworth et al. |
| 5,152,057 A | 10/1992 | Murphy |
| 5,194,327 A | 3/1993 | Takahashi et al. |
| 5,203,060 A | 4/1993 | Mraz et al. |
| 5,344,703 A | 9/1994 | Kovar et al. |
| 5,389,769 A | 2/1995 | Yamashita et al. |
| 5,420,757 A | 5/1995 | Eberhardt et al. |
| 5,448,110 A | 9/1995 | Tuttle et al. |
| 5,526,956 A | 6/1996 | Osgar |
| 5,528,222 A | 6/1996 | Moskowitz et al. |
| 5,779,839 A | 7/1998 | Tuttle et al. |
| 5,811,197 A | 9/1998 | Nishiyama et al. |

(Continued)

FOREIGN PATENT DOCUMENTS

| | | |
|---|---|---|
| DE | 10156927 | 6/2003 |
| EP | 0855675 A2 | 7/1998 |

(Continued)

OTHER PUBLICATIONS

Wu, A., and Chow, W., "A technique for rapid elimination of microbubbles for photochemical filter startup", SPIE vol. 7140, 110, 2008, 9 pgs.

(Continued)

*Primary Examiner* — Charles Freay
*Assistant Examiner* — Philip Stimpert
(74) *Attorney, Agent, or Firm* — Sprinkle IP Law Group

(57) ABSTRACT

The disclosure describes systems and methods relating generally to filtration. Even more particularly, this disclosure relates to controlling the operation of a pump using filter information. A removable filter can include an electronically readable tag storing filter information. The filter information can be read by a tag reader and rules applied to the filter information to determine whether or how to operate a pump.

17 Claims, 16 Drawing Sheets

(56) References Cited

U.S. PATENT DOCUMENTS

| | | | |
|---|---|---|---|
| 5,953,682 A | 9/1999 | McCarrick et al. | |
| 5,957,328 A | 9/1999 | Osgar | |
| 5,973,600 A | 10/1999 | Mosher, Jr. | |
| 5,986,569 A | 11/1999 | Mish et al. | |
| 6,013,949 A | 1/2000 | Tuttle | |
| 6,015,068 A | 1/2000 | Osgar et al. | |
| 6,025,054 A | 2/2000 | Tiffany, III | |
| 6,027,027 A | 2/2000 | Smithgall | |
| 6,045,000 A | 4/2000 | Rauworth et al. | |
| 6,100,804 A | 8/2000 | Brady et al. | |
| 6,147,662 A | 11/2000 | Grabau et al. | |
| 6,164,530 A | 12/2000 | Cheesebrow et al. | |
| 6,177,859 B1 | 1/2001 | Tuttle et al. | |
| 6,190,565 B1 * | 2/2001 | Bailey et al. | 210/744 |
| 6,195,007 B1 | 2/2001 | Takayama et al. | |
| 6,206,282 B1 | 3/2001 | Hayes, Sr. et al. | |
| 6,209,592 B1 | 4/2001 | Gilboa et al. | |
| 6,248,199 B1 | 6/2001 | Smulson | |
| 6,255,949 B1 | 7/2001 | Nicholson et al. | |
| 6,259,367 B1 | 7/2001 | Klein | |
| 6,302,461 B1 | 10/2001 | Debras et al. | |
| 6,303,036 B1 * | 10/2001 | Collins et al. | 210/646 |
| 6,325,294 B2 | 12/2001 | Tuttle et al. | |
| 6,330,971 B1 | 12/2001 | Mabry et al. | |
| 6,340,932 B1 | 1/2002 | Rodgers et al. | |
| 6,451,154 B1 | 9/2002 | Grabau et al. | |
| 6,483,434 B1 | 11/2002 | UmiKer | |
| 6,522,549 B2 | 2/2003 | Kano et al. | |
| 6,609,041 B1 | 8/2003 | Sanka et al. | |
| 6,661,339 B2 | 12/2003 | Muirhead | |
| 6,718,888 B2 | 4/2004 | Muirhead | |
| 6,720,865 B1 | 4/2004 | Forster et al. | |
| 6,720,877 B2 | 4/2004 | Lian et al. | |
| 6,758,000 B2 | 7/2004 | Sandt et al. | |
| 6,771,981 B1 | 8/2004 | Zalewski et al. | |
| 6,778,089 B2 | 8/2004 | Yoakum | |
| 6,816,076 B2 | 11/2004 | Pomes | |
| 6,879,876 B2 | 4/2005 | O'Dougherty et al. | |
| 6,886,246 B2 | 5/2005 | Chung | |
| 6,900,536 B1 | 5/2005 | Derbenwick et al. | |
| 6,943,678 B2 | 9/2005 | Muirhead | |
| 7,029,238 B1 | 4/2006 | Zagars et al. | |
| 7,152,781 B2 | 12/2006 | O'Dougherty et al. | |
| 7,273,172 B2 | 9/2007 | Olsen, III et al. | |
| 7,370,791 B2 | 5/2008 | O'Dougherty et al. | |
| 7,456,418 B1 | 11/2008 | Stevens et al. | |
| 7,476,087 B2 | 1/2009 | Zagars et al. | |
| 7,547,049 B2 | 6/2009 | Gashgaee | |
| 7,850,431 B2 | 12/2010 | Gonnella et al. | |
| 7,878,765 B2 | 2/2011 | Gonnella et al. | |
| 7,897,196 B2 | 3/2011 | Cedrone et al. | |
| 2002/0124945 A1 | 9/2002 | Muir et al. | |
| 2002/0187025 A1 | 12/2002 | Speasl et al. | |
| 2003/0010387 A1 | 1/2003 | Rauworth et al. | |
| 2003/0135388 A1 | 7/2003 | Martucci et al. | |
| 2003/0235027 A1 | 12/2003 | Smeyak et al. | |
| 2004/0041709 A1 | 3/2004 | Forster | |
| 2004/0094949 A1 | 5/2004 | Savagian et al. | |
| 2004/0168618 A1 | 9/2004 | Muirhead | |
| 2004/0238623 A1 | 12/2004 | Asp | |
| 2004/0262404 A1 | 12/2004 | Fujiki et al. | |
| 2005/0012620 A1 | 1/2005 | Yoakum | |
| 2005/0066563 A1 | 3/2005 | Juhan et al. | |
| 2005/0068182 A1 | 3/2005 | Dunlap et al. | |
| 2005/0099303 A1 | 5/2005 | Zuckerman | |
| 2005/0128086 A1 | 6/2005 | Brown et al. | |
| 2005/0184087 A1 | 8/2005 | Zagars et al. | |
| 2005/0197074 A1 | 9/2005 | Cullen et al. | |
| 2005/0199700 A1 | 9/2005 | Baker et al. | |
| 2005/0205658 A1 | 9/2005 | Baker et al. | |
| 2005/0237184 A1 | 10/2005 | Muirhead | |
| 2005/0237195 A1 | 10/2005 | Urban | |
| 2005/0241548 A1 | 11/2005 | Muirhead | |
| 2005/0280542 A1 | 12/2005 | Shieh | |
| 2005/0285735 A1 | 12/2005 | Imura et al. | |
| 2006/0060512 A1 | 3/2006 | Astle et al. | |
| 2006/0283932 A1 | 12/2006 | Asp et al. | |
| 2007/0104586 A1 | 5/2007 | Cedrone et al. | |
| 2007/0125797 A1 | 6/2007 | Cedrone et al. | |
| 2007/0128046 A1 | 6/2007 | Gonnella et al. | |
| 2007/0128048 A1 | 6/2007 | Gonnella et al. | |
| 2007/0128050 A1 | 6/2007 | Cedrone et al. | |
| 2008/0131290 A1 | 6/2008 | Magoon et al. | |
| 2008/0135498 A1 | 6/2008 | Bright et al. | |
| 2008/0175719 A1 * | 7/2008 | Tracey et al. | 417/38 |
| 2009/0045140 A1 | 2/2009 | Zahka et al. | |
| 2009/0047143 A1 | 2/2009 | Cedrone et al. | |
| 2009/0132094 A1 | 5/2009 | Laverdiere et al. | |
| 2010/0247775 A1 | 9/2010 | Thomas et al. | |
| 2010/0262304 A1 | 10/2010 | Gonnella et al. | |
| 2011/0098864 A1 | 4/2011 | Gonnella et al. | |
| 2011/0211976 A1 | 9/2011 | Magoon et al. | |
| 2012/0128505 A1 | 5/2012 | Braggin et al. | |

FOREIGN PATENT DOCUMENTS

| | | |
|---|---|---|
| GB | 2424928 | 10/2005 |
| JP | 2002-024783 A | 1/2002 |
| JP | 2002-183695 A | 6/2002 |
| JP | 2002-298116 A | 10/2002 |
| JP | 2009018308 | 1/2009 |
| WO | WO 94/18700 A1 | 8/1994 |
| WO | WO 00/02236 A2 | 1/2000 |
| WO | WO 00/21030 A1 | 4/2000 |
| WO | WO 00/43952 A1 | 7/2000 |
| WO | WO01/40646 A2 | 6/2001 |
| WO | WO 02/056344 A2 | 7/2002 |
| WO | WO 03/060818 A2 | 7/2003 |
| WO | WO 2005/081182 A2 | 9/2005 |
| WO | WO2009/059324 A2 | 5/2009 |

OTHER PUBLICATIONS

International Search Report and Written Opinion for PCT Patent Application No. PCT/US2011/025402, mailed Jul. 14, 2011, 10 pgs.

LG International Identification Technologies, The FIM Process Illustrated two-page printout from website, Copyright 2001.

LG International Identification Technologies, "Our FIM system is setting the standard for the rest of the industry" two-page printout from website, Copyright, 2001.

Modern Plastics, "RFID is here—is it time for you to worry?," Dec. 2004, p. 66-67.

International Search Report and Written Opinion for PCT Patent Application No. PCT/US2011/025403, mailed Jun. 14, 2011, 11 pages.

Mykrolis; Optimizer II ST Manifold; "The Solution for Rapid Filter Changeout", Product Profile, 2004, 2 pgs.

Office Action for U.S. Appl. No. 12/714,148, mailed Apr. 5, 2012, 10 Pages.

International Search Report and Written Opinion issued for PCT Application No. PCT/US2011/057061, mailed May 11, 2012, 8 Pages.

International Preliminary Report on Patentability issued for PCT Application No. PCT/US2011/025402, mailed Sep. 7, 2012, 8 pages.

International Preliminary Report on Patentability issued for PCT Application No. PCT/US2011/025403, mailed Sep. 7, 2012, 9 pages.

International Preliminary Report on Patentability issued for PCT Application No. PCT/US2011/057061, mailed May 2, 2012, 5 pages.

Final Office Action issued for U.S. Appl. No. 12/714,148, mailed Nov. 21, 2012, 10 pages.

Notice of Allowance issued in U.S. Appl. No. 12/714,148, mailed Nov. 8, 2013, 5 pages.

* cited by examiner

| SYSTEM SEGMENT NAME | SYSTEM SEGMENT NUMBER | VALVE DELAY NUMBER | DISPENSE FORWARD | DISPENSE REVERSE | DISPENSE | FEED FORWARD | FEED REVERSE | VALVE INLET | VALVE PURGE | VALVE VENT | VALVE ISOLATE | VALVE BARRIER |
|---|---|---|---|---|---|---|---|---|---|---|---|---|
| READY | | | | | | | | | | | | |
| OPEN ADJ | 1 | | | | ▨ | | ▨ | | | | | |
| DISPENSE AND FILL | 2 | | ▨ | | ▨ | | ▨ | | | | | |
| DISPENSE AND FILL | 3 | | ▨ | | ▨ | | ▨ | | | | | |
| DISPENSE AND FILL | 4 | | ▨ | | ▨ | | ▨ | | | | | |
| DISPENSE AND FILL | 5 | | ▨ | | ▨ | | ▨ | | | | | |
| DISPENSE AND FILL | 6 | | ▨ | | ▨ | | ▨ | | | | | |
| CLOSE ADJ | 7 | | | | ▨ | | ▨ | | | | | |
| END FILL | 8 | | | | | | ▨ | | | | | |
| | 9 | 0 | | | | ▨ | | | | | | |
| | 10 | 1 | | | | ▨ | | | | | | |
| | 11 | 2 | | | | | | ▨ | | | ▨ | |
| | 12 | 3 | | | | | | | | | ▨ | |
| PRE FILTR | 13 | | | | | | ▨ | | | | ▨ | |
| FILTRATION | 14 | | | ▨ | | | ▨ | | | | ▨ | |
| | 15 | 4 | | | | | | | | | ▨ | |
| | 16 | 5 | | | | | | | | | ▨ | |
| VENT | 17 | | | | | | ▨ | | | ▨ | ▨ | |
| | 18 | 6 | | | | | | | | | ▨ | |
| PRS ZERO A | 19 | 7 | | | | | | | | | ▨ | |
| | 20 | 8 | | | | | | ▨ | | | ▨ | |
| | 21 | 9 | | | | | | ▨ | | | ▨ | |
| | 22 | 10 | | | | | | ▨ | | | ▨ | ▨ |
| | 23 | 11 | | | | | | ▨ | ▨ | | ▨ | |
| | 24 | 12 | ▨ | | | | | ▨ | | | ▨ | |
| PURGE | 25 | | | | | | | ▨ | ▨ | | ▨ | |
| ST PRG | 26 | 13 | | | | | | ▨ | ▨ | | ▨ | |
| PRS ZERO B | 27 | 14 | | | | | | ▨ | ▨ | | ▨ | |
| | 28 | 15 | | | | | | | ▨ | | ▨ | |
| P.C. 2A | 29 | | | | ▨ | | | | ▨ | | | |

| System Segment Group | System Segment Name | Segment Number | Valve Delay Number | DISPENSE | | FEED | | INLET VALVE | OUTLET VALVE | PURGE VALVE | VENT VALVE | ISOLATION VALVE | BARRIER VALVE |
|---|---|---|---|---|---|---|---|---|---|---|---|---|---|
| | | | | FORWARD | REVERSE | FORWARD | REVERSE | | | | | | |
| READY | READY | | | | | | ▨ | | | | | | |
| DISPENSE | OPEN ADJ | 1 | | | | | ▨ | | | | | | |
| DISPENSE | DISPENSE AND FILL | 2 | | | ▨ | | ▨ | | | | | | |
| DISPENSE | DISPENSE AND FILL | 3 | | | ▨ | | ▨ | | | | | | |
| DISPENSE | DISPENSE AND FILL | 4 | | ▨ | | | ▨ | | | | | | |
| DISPENSE | DISPENSE AND FILL | 5 | | ▨ | | | ▨ | | | | | | |
| DISPENSE | DISPENSE AND FILL | 6 | | ▨ | | | ▨ | | | | | | |
| DISPENSE | CLOSE ADJ | 7 | | | | | ▨ | | | | | | |
| DISPENSE | POST DISPENSE DELAY | 8 | | | | | ▨ | | | | | | |
| RECHARGE | ENABLE RECHARGE | 9 | | | | | | | | | | | |
| RECHARGE | ISOLATE VALVE OPEN | 10 | | | | | | | | | | ▨ | |
| RECHARGE | BARRIER VALVE OPEN | 11 | | | | | | | | | | ▨ | ▨ |
| RECHARGE | INLET VALVE CLOSE | 12 | | | | | | | | | | ▨ | ▨ |
| RECHARGE | FILTRATION | 13 | | | | ▨ | | ▨ | | | | ▨ | ▨ |
| RECHARGE | POST FILTRATION | 14 | | | | ▨ | | | | | | ▨ | ▨ |
| RECHARGE | INLET VALVE OPEN | 15 | | | | | | ▨ | | | | ▨ | ▨ |
| RECHARGE | PURGE VALVE OPEN | 16 | | | | | | ▨ | | ▨ | | ▨ | ▨ |

TIME →

TO FIG. 4G

METHOD AND SYSTEM FOR CONTROLLING OPERATION OF A PUMP BASED ON FILTER INFORMATION IN A FILTER INFORMATION TAG

TECHNICAL FIELD

The disclosure describes systems and methods relating generally to filtration. Even more particularly, this disclosure relates to controlling the operation of a pump using filter information.

BACKGROUND

There are many applications for which precise control over the amount and/or rate at which a fluid is dispensed by a pumping apparatus is necessary. In semiconductor processing, for example, it is important to control the amount and rate at which photochemicals, such as photoresist chemicals, are applied to a semiconductor wafer. The coatings applied to semiconductor wafers during processing typically require a uniformity of thickness across the surface of the wafer that is measured in angstroms. The rates at which processing chemicals are applied to the wafer must be controlled in order to ensure that the processing liquid is applied uniformly.

Many photochemicals used in the semiconductor industry today are very expensive, frequently costing upwards of $1000 a liter. Therefore, it is preferable to ensure that chemical processing equipment is operating correctly.

SUMMARY OF THE DISCLOSURE

Embodiments described herein provide systems and methods for controlling the operation of a pump using information about the filter connected to the pump. One embodiment described herein can include a pump having one or more motors to draw fluid into an inlet of the pump and dispense fluid from an outlet of the pump. The pump can further include a connection for a removable filter so that the removable filter can be placed in a fluid flow path between the pump inlet and pump outlet. The pump can further comprise an electronic tag reader positioned and configured to read filter information from an electronic tag on a removable filter when the removable filter is connected to the pump. The pump can further include a pump controller configured to receive filter information from the electronic tag reader and apply one or more rules to the filter information to determine further operation of the pump.

Another embodiment can comprise a pump having one or more motors to draw fluid into an inlet of the pump and dispense fluid from an outlet of the pump. The pump can also include a removable filter in a fluid flow path between the pump inlet and pump outlet. The filter can have an electronic tag storing filter information for the removable filter. The pump can include an electronic tag reader positioned and configured to read the filter information from the electronic tag. A pump controller can be coupled to the electronic tag reader and configured to receive filter information from the electronic tag reader and apply one or more rules to the filter information to determine further operation of the pump.

Another embodiment can include a method of determining operation of a pump. The method can include connecting a filter having an electronic tag storing filter information to a pump, reading the filter information from the electronic tag with an electronic tag reader, communicating the filter information from the electronic tag reader to a pump controller coupled to the electronic tag reader and applying one or more rules to the filter information to determine further operation of the pump.

According to one embodiment, filter information can be stored in an RFID tag and read by an RFID tag reader.

BRIEF DESCRIPTION OF THE DRAWINGS

A more complete understanding of the embodiments and the advantages thereof may be acquired by referring to the following description, taken in conjunction with the accompanying drawings in which like reference numbers indicate like features and wherein:

FIGS. 3 and 4A-4G are diagrammatic representations of valve and motor timings for various embodiments of dispense cycles;

DETAILED DESCRIPTION

The disclosure and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the disclosure in detail. Skilled artisans should understand, however, that the detailed description and the specific examples, while disclosing preferred embodiments, are given by way of illustration only and not by way of limitation. Various substitutions, modifications, additions or rearrangements within the scope of the underlying inventive concept(s) will become apparent to those skilled in the art after reading this disclosure.

Various embodiments described herein are related to a pumping system that utilizes filter information to ensure proper operation of a pump. According to one embodiment, the filter information is stored in an electronically readable tag that can be read by an appropriate tag reader. The filter information can be analyzed to determine proper operation of the pump.

Figure 1:
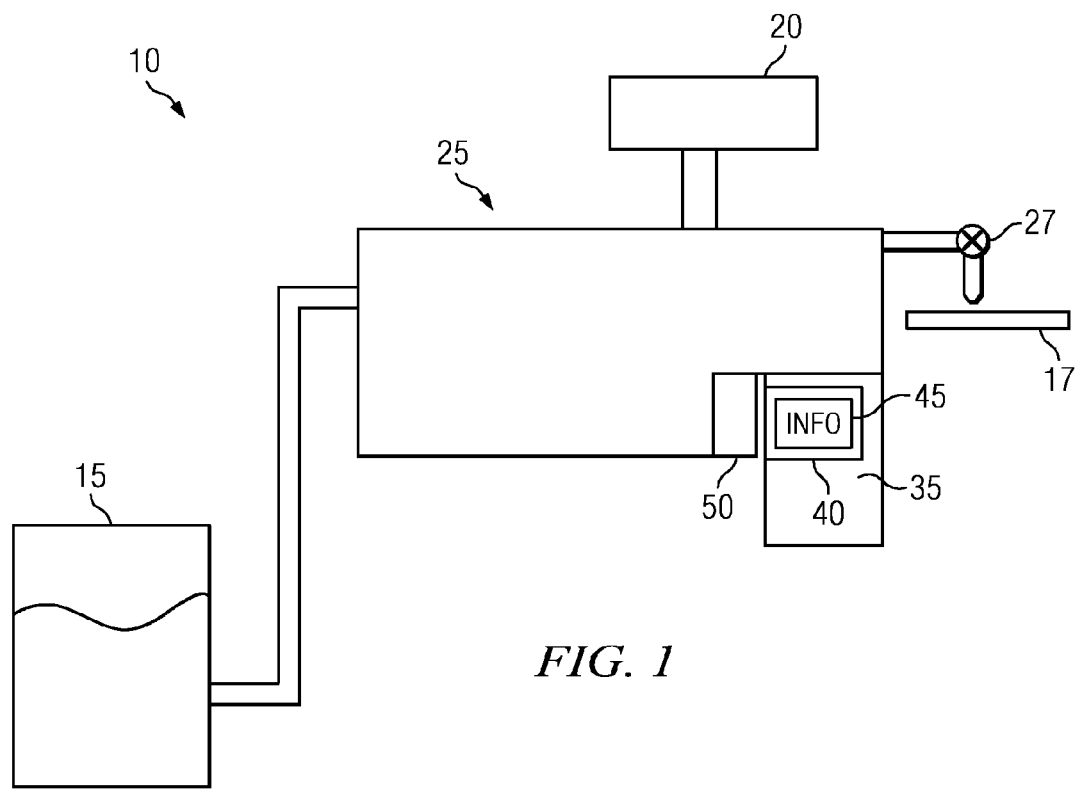
FIG. 1 is a diagrammatic representation of one embodiment of a portion of a semiconductor manufacturing system.

FIG. 1 is a diagrammatic representation of one embodiment of a portion of a semiconductor manufacturing system 10 for dispensing fluid from a fluid reservoir 15 onto a wafer 17. System 10 can also include a pump controller 20 and pump 25. Pump controller 20 can be onboard pump 25 or connected to pump 25 via a one or more communications links for communicating control signals, data or other information. Pump controller 20 controls pump 25 to dispense fluid onto wafer 17. System 10 can also include external valves such as a stop/suckback valve 27 that can prevent dripping at the dispense nozzle.

Pump 25 includes a removable filter 35 that has electronically readable filter information tag 40 containing filter information 45. Filter information 45 can include any information about filter 35 and other information that can be stored in an electronically readable tag. A tag reader 50 to read filter information 45 from filter information tag 40 and provide the information to pump controller 20, a system management computer or other computer.

In one embodiment, filter information tag 40 can be an active or passive RFID tag and tag reader 50 can be an RFID tag reader. In other embodiments, filter information tag 40 can be a bar code or other optically readable code and tag reader 50 can be a bar code scanner or other scanner capable of reading tag 40.

Examples of filter information 45 include, but are not limited to, part number, design style, membrane type, retention rating, generation of the filter, configuration of the filter membrane, lot number, serial number, a device flow, membrane thickness, membrane bubble point, particle quality, filter manufacturer quality information or other information. The design style indicates the type of pump for which the filter is designed, the capacity/size of the filter, amount of membrane material in the filter or other information about the design of the filter. The membrane type indicates the material and/or thickness of the membrane. The retention rating indicates the size of particles that can be removed with a particular efficiency by the membrane. The generation of the filter indicates whether the filter is a first, second, third or other generation of the filter design. The configuration of the filter membrane indicates whether the filter is pleated, the type of pleating or other information regarding the design of the membrane. The serial number provides the serial number of the individual filter. The lot number can specify the manufacturing lot of the filter or membrane. The device flow indicates the flow rate the filter can handle while still producing good dispenses. The device flow can be determined during manufacture for the individual filter. The membrane bubble point provides another measure of the flow rates/pressure the filter can handle and still produce good dispenses. The membrane bubble point can also be determined during manufacture for the individual filter. The above examples are provided by way of explanation are not limiting of the information that can be contained in filter information 45.

Filter information 45 can include a part number that conveys a variety of information. For example, each letter in the example part number format "Aabcdefg" can convey a different piece of information. Table 1 below provides an example of information conveyed by the part number:

TABLE 1

| Letter | Information | Examples |
|---|---|---|
| A | Connectology | |
| a | Design Style --Indicates the type of pump for which the filter is designed. | For IntelliGen Pump Filters:<br>P = wide body pump (IntelliGen1 or IntelliGen2)<br>2 or M = IntelliGen3 or IntelliGen Mini Pump |
| b | Membrane Type-Type of Membrane Used in Filter | A = thin UPE<br>U = thick UPE<br>S = asymmetric<br>D = Duo (nylon and UPE or other combination)<br>M = PCM (chemically modified UPE)<br>N = nylon |
| c | Retention Rating of membrane | G = 0.2 um<br>V = 0.1 um<br>Z = 0.05 um<br>Y = 30 nm<br>X = 20 nm<br>T = 10 nm<br>F = 5 nm<br>K = 3 nm |
| d | Generation-generation of filter | 0 = V1<br>2 = V2 |
| e | RFID | R = RFID |
| f | Pleat-Type of Pleating Used in Filter | 0 = Standard<br>M = M pleat |
| g | Where O-Ring is Located | 0 = OM<br>K = Karlez<br>E = EPDM<br>R = O-ringless |
| h | How Many Filters in a Box | 1 = 1 per box<br>3 = 3 per box |

Using the example of Table 1, the part number A2AT2RMR1 for an Impact pump filter would indicate that the connectology of the filter, the filter is designed for an IntelliGen2 Pump (Impact and IntelliGen are trademarks of Entegris, Inc. of Chaska, Minn.), the membrane is thin UPE, has a retention rating of 10 nm, the filter is a version 2 filter, the filter includes an RFID tag, the filter membrane has an M-pleat, the filter is O-ringless and there is one filter per box. The use of a part number to convey information, however, is provided by way of example and filter information can be conveyed in other manners.

In operation, filter 35 can be coupled to pump 25. Tag reader 50 reads filter information 45 from tag 40 and communicates the filter information 45 to pump controller 20. Pump controller 20 processes filter information 45 or passes the filter information 45 on to a pump management system (discussed below). Pump controller 20 can apply rules to filter information 45 to determine whether and how to operate pump 25. Additionally, pump controller 20 can adjust the operation of pump 25 during a dispense cycle based on filter information 45.

Figure 2:
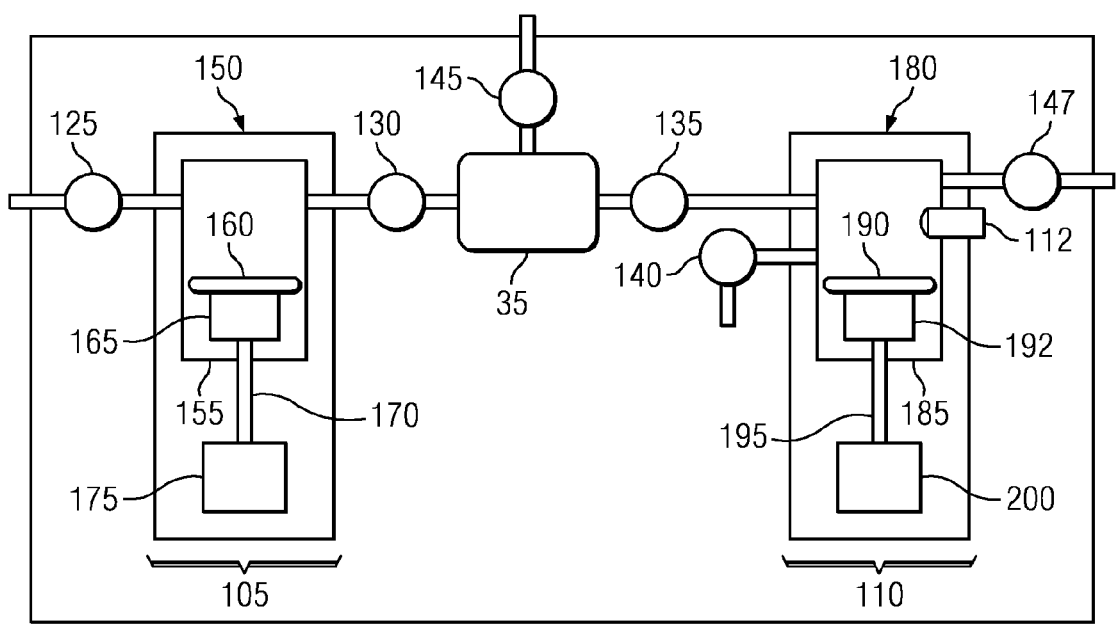
FIG. 2 is a diagrammatic representation of a multiple stage pump ("multi-stage pump") according to one embodiment.

Pump 25 can be any suitable pump including a single stage pump or multiple stage ("multi-stage") pump. FIG. 2 is a diagrammatic representation of one embodiment of a multi-stage pump 25. Multi-stage pump 25 includes a feed stage portion 105 and a separate dispense stage portion 110. Located between feed stage portion 105 and dispense stage portion 110, from a fluid flow perspective, is filter 35 to filter impurities from the process fluid. A number of valves can control fluid flow through multi-stage pump 25 including, for example, inlet valve 125, isolation valve 130, barrier valve 135, purge valve 140, vent valve 145 and outlet valve 147. Dispense stage portion 110 can further include a pressure sensor 112 that determines the pressure of fluid at dispense stage 110. The pressure determined by pressure sensor 112 can be used to control the speed of the various pumps as described below. Example pressure sensors include ceramic and polymer piezoresistive and capacitive pressure sensors, including those manufactured by Metallux AG, of Korb, Germany. According to one embodiment, the face of pressure sensor 112 that contacts the process fluid is a perfluoropolymer. Pump 25 can include additional pressure sensors, such as a pressure sensor to read pressure in feed chamber 155, temperature sensors and other sensors.

Feed stage 105 and dispense stage 110 can include rolling diaphragm pumps to pump fluid in multi-stage pump 25. Feed-stage pump 150 ("feed pump 150"), for example, includes a feed chamber 155 to collect fluid, a feed stage diaphragm 160 to move within feed chamber 155 and displace fluid, a piston 165 to move feed stage diaphragm 160, a lead screw 170 and a stepper motor 175. Lead screw 170 couples to stepper motor 175 through a nut, gear or other mechanism for imparting energy from the motor to lead screw 170. According to one embodiment, feed motor 170 rotates a nut that, in turn, rotates lead screw 170, causing piston 165 to actuate. Dispense-stage pump 180 ("dispense pump 180") can similarly include a dispense chamber 185, a dispense stage diaphragm 190, a piston 192, a lead screw 195, and a dispense motor 200. Dispense motor 200 can drive lead screw 195 through a threaded nut (e.g., a Torlon or other material nut).

According to other embodiments, feed stage 105 and dispense stage 110 can be a variety of other pumps including pneumatically or hydraulically actuated pumps, hydraulic pumps or other pumps. One example of a multi-stage pump using a pneumatically actuated pump for the feed stage and a stepper motor driven hydraulic pump is described in U.S. patent application Ser. No. 11/051,576 entitled "PUMP CONTROLLER FOR PRECISION PUMPING APPARATUS" by inventors Zagars et al., filed Feb. 4, 2005, now issued as U.S. Pat. No. 7,476,087 on Jan. 13, 2009, hereby incorporated by reference. The use of motors at both stages, however, provides an advantage in that the hydraulic piping, control systems and fluids are eliminated, thereby reducing space and potential leaks. Examples of multi-stage pumps using motors in both the feed stage and dispense stage are provided in U.S. patent application Ser. No. 11/602,464 entitled "SYSTEM AND METHOD FOR A PUMP WITH REDUCED FORM FACTOR" by inventors Cedrone et al, filed Nov. 20, 2006; and U.S. patent application Ser. No. 12/218,325 entitled "METHOD AND SYSTEM FOR HIGH VISCOSITY PUMP" by inventors Cedrone et al, filed Jul. 14, 2008; which are hereby fully incorporated by reference herein.

Feed motor 175 and dispense motor 200 can be any suitable motor. According to one embodiment, dispense motor 200 is a Permanent-Magnet Synchronous Motor ("PMSM"). The PMSM can be controlled by a digital signal processor ("DSP") utilizing Field-Oriented Control ("FOC") or other type of position/speed control known in the art at motor 200, a controller onboard multi-stage pump 25 or a separate pump controller (e.g. as shown in FIG. 1). PMSM 200 can further include an encoder (e.g., a fine line rotary position encoder) for real time feedback of dispense motor 200's position. The use of a position sensor gives accurate and repeatable control of the position of piston 192, which leads to accurate and repeatable control over fluid movements in dispense chamber 185. For, example, using a 2000 line encoder, which according to one embodiment gives 8000 pulses to the DSP, it is possible to accurately measure to and control at 0.045 degrees of rotation. In addition, a PMSM can run at low velocities with little or no vibration. Feed motor 175 can also be a PMSM or a stepper motor. It should also be noted that the feed pump can include a home sensor to indicate when the feed pump is in its home position.

During operation of multi-stage pump 25, the valves of multi-stage pump 25 are opened or closed to allow or restrict fluid flow to various portions of multi-stage pump 25. According to one embodiment, these valves can be pneumatically actuated (i.e., gas driven) diaphragm valves that open or close depending on whether pressure or a vacuum is asserted. All or some of the valves can also be other types of valves.

The following provides a summary of various stages of operation of multi-stage pump 25. However, multi-stage pump 25 can be controlled according to a variety of control schemes including, but not limited to those described in U.S. Provisional Patent Application No. 60/741,682 entitled "SYSTEM AND METHOD FOR PRESSURE COMPENSATION IN A PUMP" by Inventors Cedrone et al., filed Dec. 2, 2005; U.S. patent application Ser. No. 11/502,729 entitled "SYSTEMS AND METHODS FOR FLUID FLOW CONTROL IN AN IMMERSION LITHOGRAPHY SYSTEM" by Inventors Clarke et al., filed Aug. 11, 2006, now issued as U.S. Pat. No. 7,443,483 on Oct. 28, 2008; U.S. patent application Ser. No. 11/602,472, entitled "SYSTEM AND METHOD FOR CORRECTING FOR PRESSURE VARIATIONS USING A MOTOR" by Inventors Cedrone et al., filed Nov. 20, 2006; U.S. patent application Ser. No. 11/292,559 entitled "SYSTEM AND METHOD FOR CONTROL OF FLUID PRESSURE" by Inventors Gonnella et al., filed Dec. 2, 2005; U.S. patent application Ser. No. 11/364,286 entitled "SYSTEM AND METHOD FOR MONITORING OPERATION OF A PUMP" by Inventors Gonnella et al., filed Feb. 28, 2006; U.S. patent application Ser. No. 11/602,508, entitled "SYSTEM AND METHOD FOR PRESSURE COMPENSATION IN A PUMP" by Inventors Cedrone et al., filed Nov. 20, 2006; and U.S. patent application Ser. No. 11/602,449, entitled "I/O SYSTEMS, METHODS AND DEVICES FOR INTERFACING A PUMP CONTROLLER" by Inventors Cedrone et al., filed Nov. 20, 2006; each of which is fully incorporated by reference herein, to sequence valves and control pressure.

According to one embodiment, multi-stage pump 25 can include a ready segment, dispense segment, fill segment, pre-filtration segment, filtration segment, vent segment, purge segment and static purge segment. During the feed segment, inlet valve 125 is opened and feed stage pump 150 moves (e.g., pulls) feed stage diaphragm 160 to draw fluid into feed chamber 155. Once a sufficient amount of fluid has filled feed chamber 155, inlet valve 125 is closed. During the filtration segment, feed-stage pump 150 moves feed stage diaphragm 160 to displace fluid from feed chamber 155. Isolation valve 130 and barrier valve 135 are opened to allow fluid to flow through filter 35 to dispense chamber 185. Isolation valve 130, according to one embodiment, can be opened first (e.g., in the "pre-filtration segment") to allow pressure to build in filter 35 and then barrier valve 135 opened to allow fluid flow into dispense chamber 185. According to other embodiments, both isolation valve 130 and barrier valve 135 can be opened and the feed pump moved to build pressure on the dispense side of the filter.

During the filtration segment, dispense pump 180 can be brought to its home position. As described in U.S. Provisional Patent Application No. 60/630,384, entitled "SYSTEM AND METHOD FOR A VARIABLE HOME POSITION DISPENSE SYSTEM" by Layerdiere, et al. filed Nov. 23, 2004; U.S. patent application Ser. No. 11/666,124, entitled "SYSTEM AND METHOD FOR A VARIABLE HOME POSITION DISPENSE SYSTEM" by Layerdiere, et al. filed Sep. 30, 2008; and PCT Application No. PCT/US2005/042127, entitled "SYSTEM AND METHOD FOR VARIABLE HOME POSITION DISPENSE SYSTEM", by Applicant Entegris, Inc. and Inventors Layerdiere et al., filed Nov. 21, 2005; all of which are hereby incorporated by reference, the home position of the dispense pump can be a position that gives the greatest available volume at the dispense pump for the dispense cycle, but is less than the maximum available volume that the dispense pump could provide. The home position is selected based on various parameters for the dispense cycle to reduce unused hold up volume of multi-stage pump 25. Feed pump 150 can similarly be brought to a home position that provides a volume that is less than its maximum available volume.

At the beginning of the vent segment, isolation valve 130 is opened, barrier valve 135 closed and vent valve 145 opened. In another embodiment, barrier valve 135 can remain open during the vent segment and close at the end of the vent segment. During this time, if barrier valve 135 is open, the pressure can be understood by the controller because the pressure in the dispense chamber, which can be measured by pressure sensor 112, will be affected by the pressure in filter 35. Feed-stage pump 150 applies pressure to the fluid to remove air bubbles from filter 35 through open vent valve 145. Feed-stage pump 150 can be controlled to cause venting to occur at a predefined rate, allowing for longer vent times and lower vent rates, thereby allowing for accurate control of the amount of vent waste. If feed pump is a pneumatic style pump, a fluid flow restriction can be placed in the vent fluid path, and the pneumatic pressure applied to feed pump can be increased or decreased in order to maintain a "venting" set point pressure, giving some control of an otherwise un-controlled method.

At the beginning of the purge segment, isolation valve 130 is closed, barrier valve 135, if it is open in the vent segment, is closed, vent valve 145 closed, and purge valve 140 opened and inlet valve 125 opened. Dispense pump 180 applies pressure to the fluid in dispense chamber 185 to vent air bubbles through purge valve 140. During the static purge segment, dispense pump 180 is stopped, but purge valve 140 remains open to continue to vent air. Any excess fluid removed during the purge or static purge segments can be routed out of multi-stage pump 25 (e.g., returned to the fluid source or discarded) or recycled to feed-stage pump 150. During the ready segment, inlet valve 125, isolation valve 130 and barrier valve 135 can be opened and purge valve 140 closed so that feed-stage pump 150 can reach ambient pressure of the source (e.g., the source bottle). According to other embodiments, all the valves can be closed at the ready segment.

During the dispense segment, outlet valve 147 opens and dispense pump 180 applies pressure to the fluid in dispense chamber 185. Because outlet valve 147 may react to controls more slowly than dispense pump 180, outlet valve 147 can be opened first and some predetermined period of time later dispense motor 200 started. This prevents dispense pump 180 from pushing fluid through a partially opened outlet valve 147. Moreover, this prevents fluid moving up the dispense nozzle caused by the valve opening, followed by forward fluid motion caused by motor action. In other embodiments, outlet valve 147 can be opened and dispense begun by dispense pump 180 simultaneously.

An additional suckback segment can be performed in which excess fluid in the dispense nozzle is removed. During the suckback segment, outlet valve 147 can close and a secondary motor or vacuum can be used to suck excess fluid out of the outlet nozzle. Alternatively, outlet valve 147 can remain open and dispense motor 200 can be reversed to such fluid back into the dispense chamber. The suckback segment helps prevent dripping of excess fluid onto the wafer.

Figure 3:
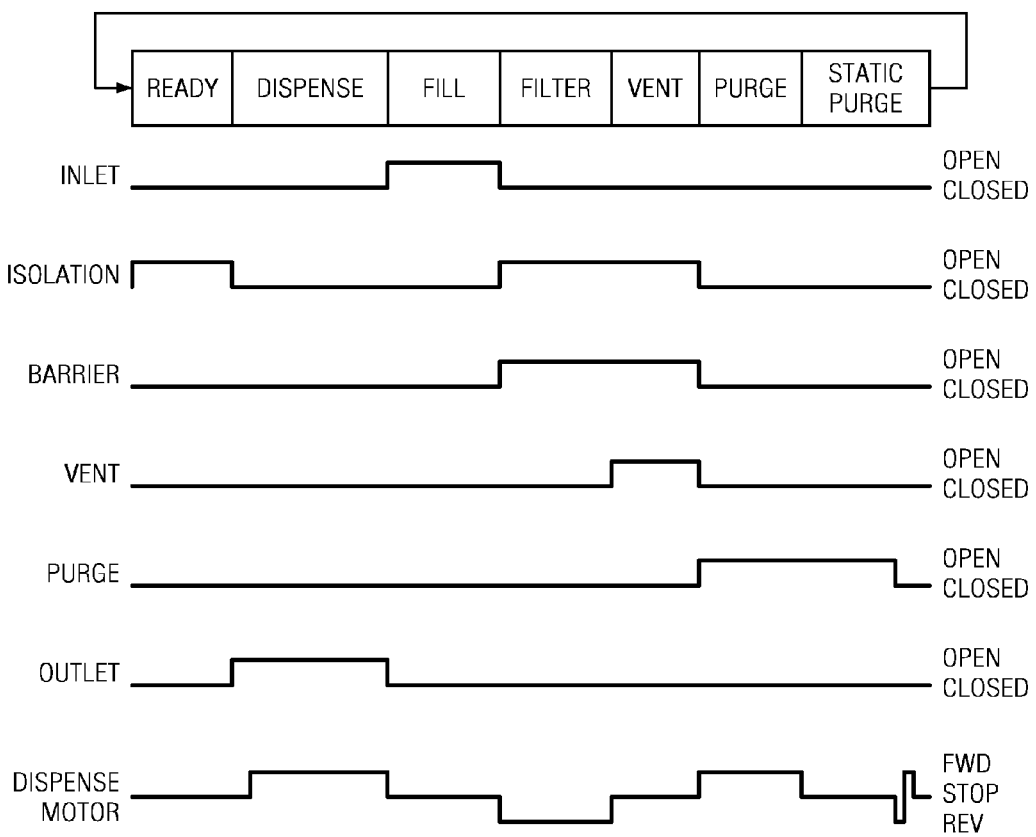
Figure 4B:
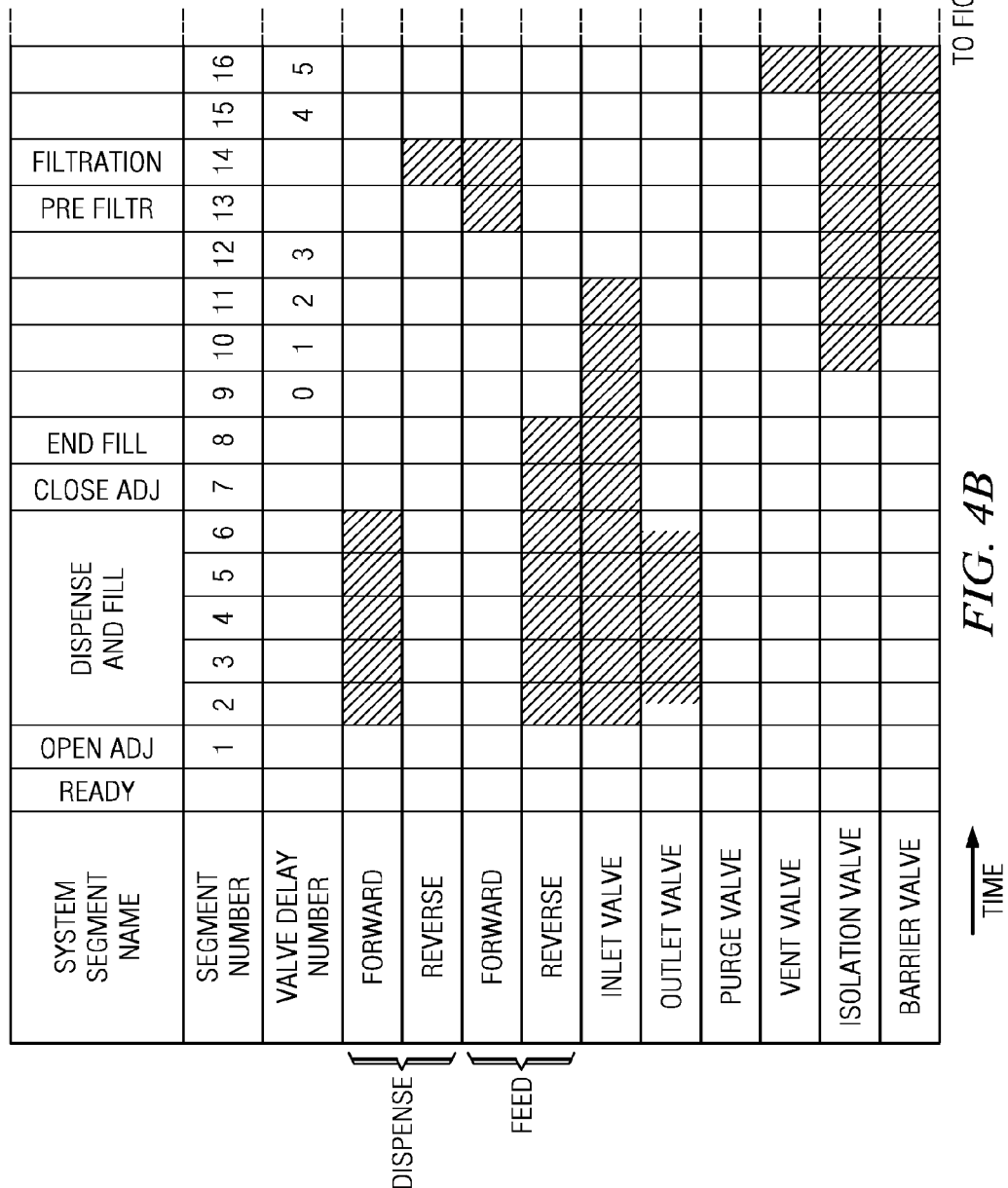
Figure 4C:
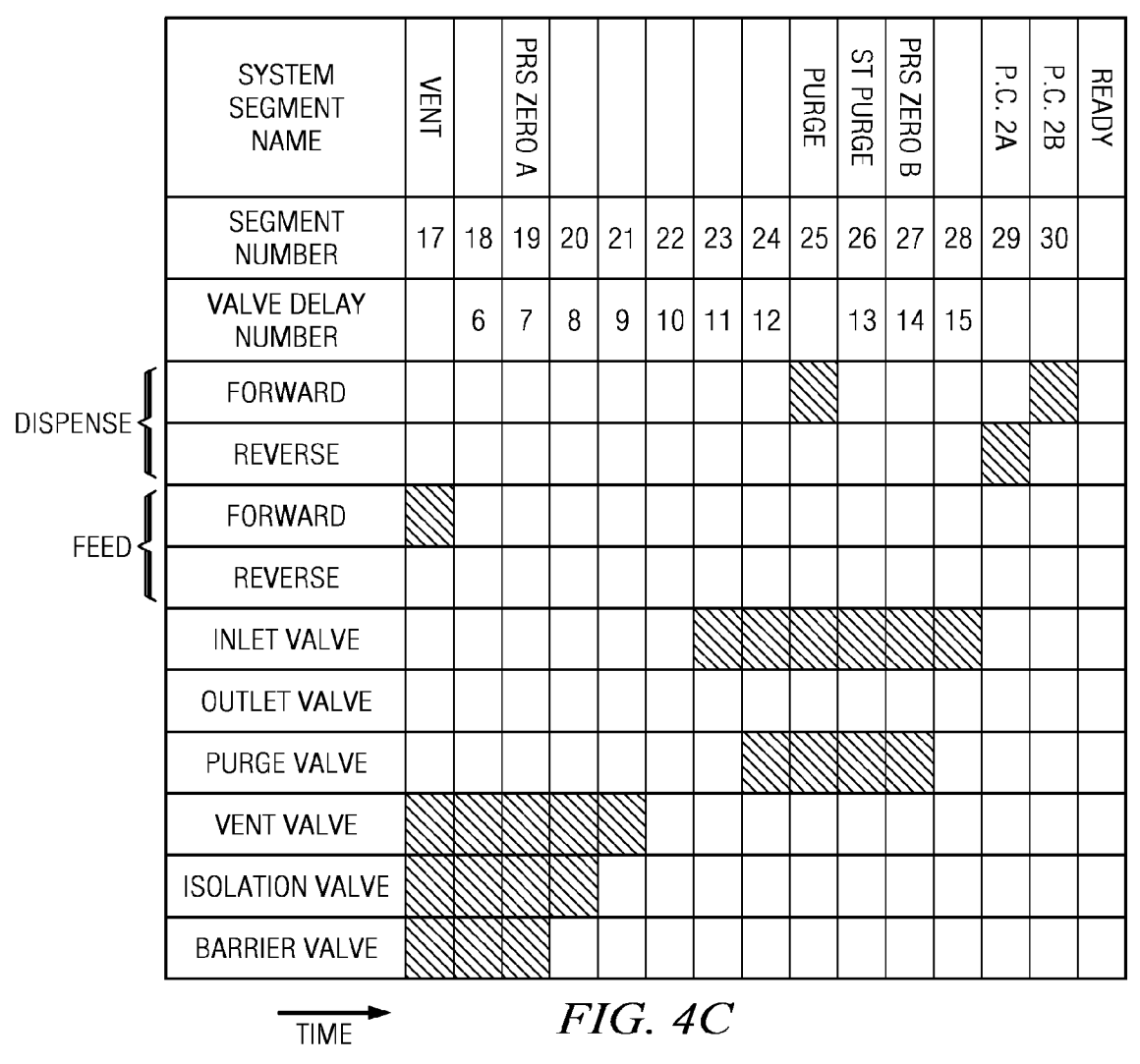
Figure 4D:
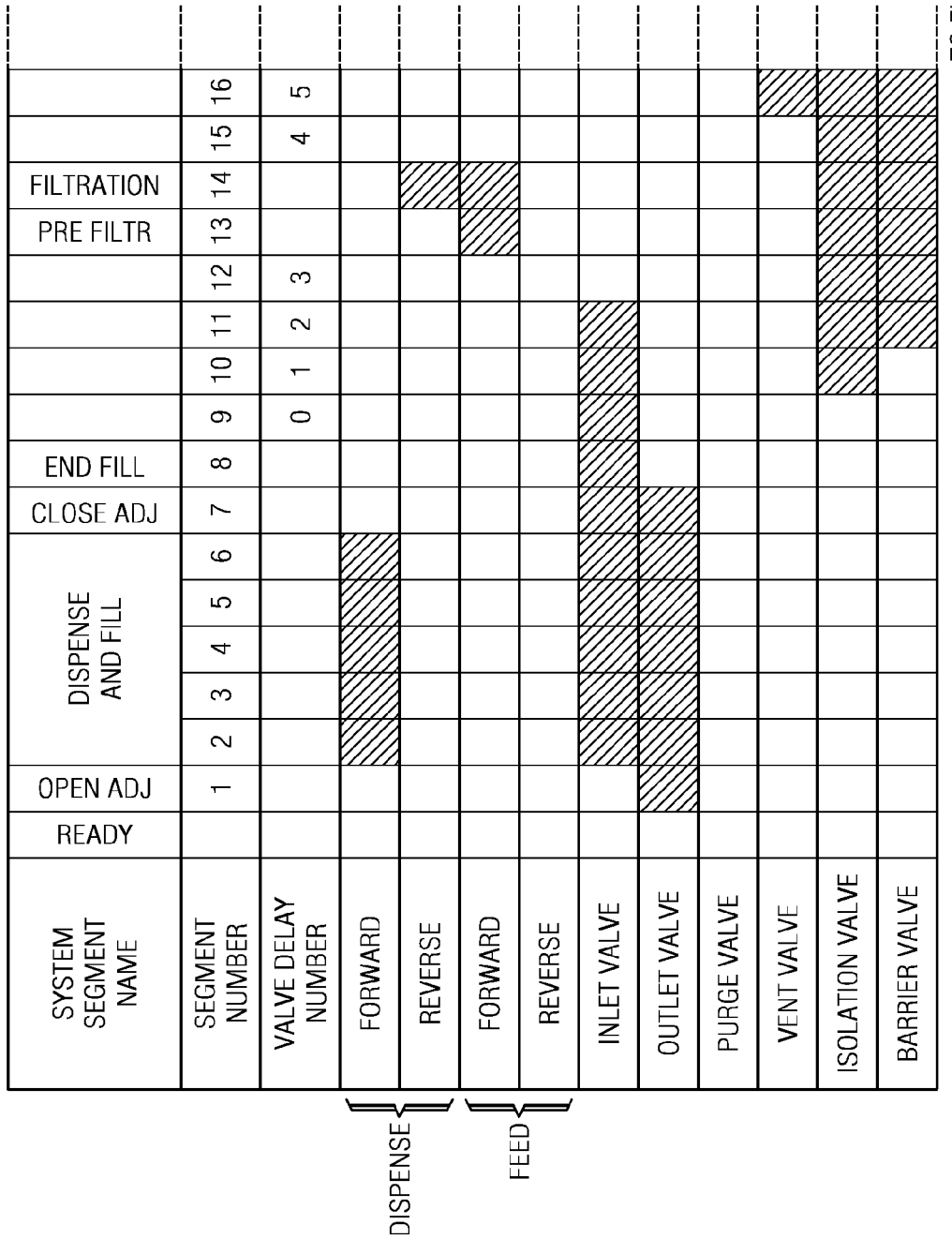
Figure 4E:
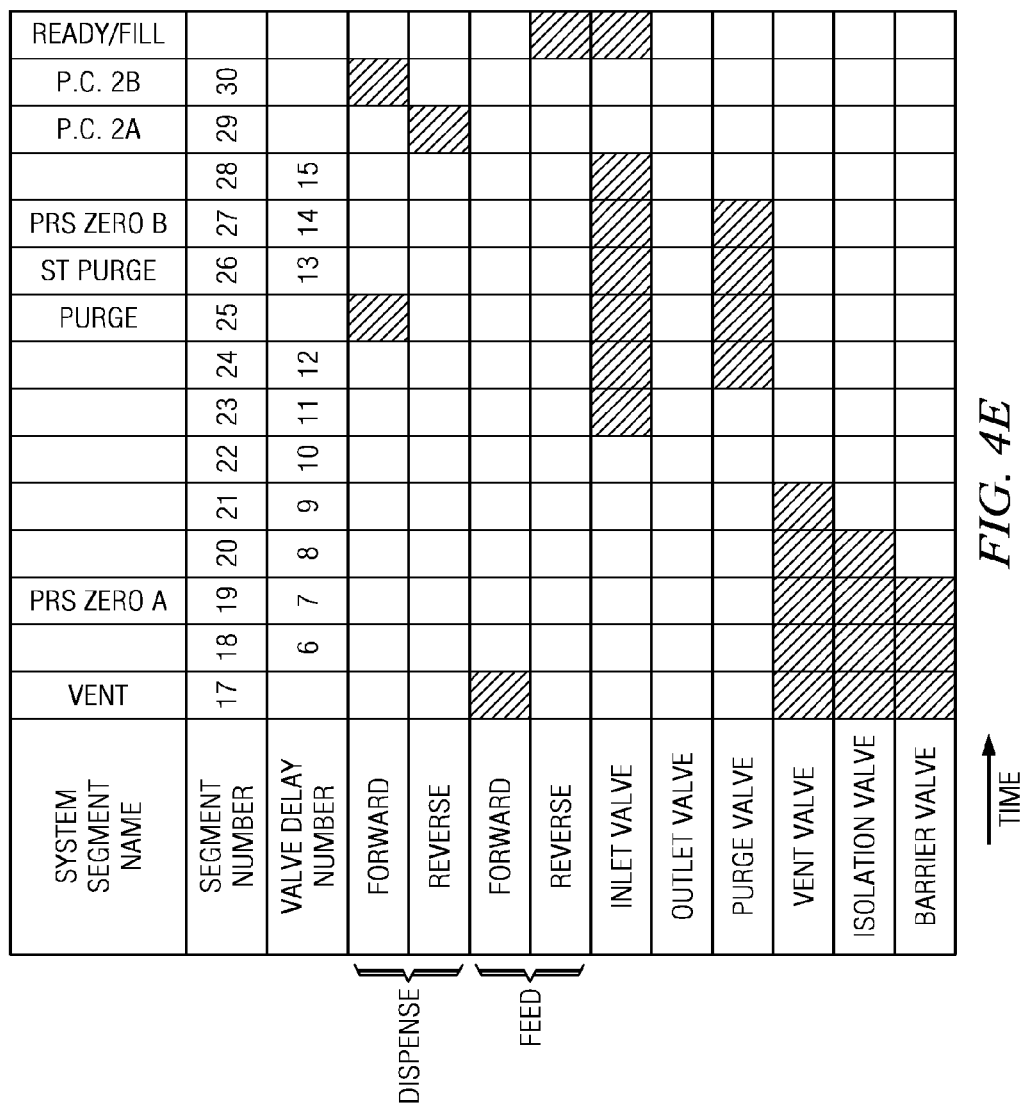
Figure 4G:
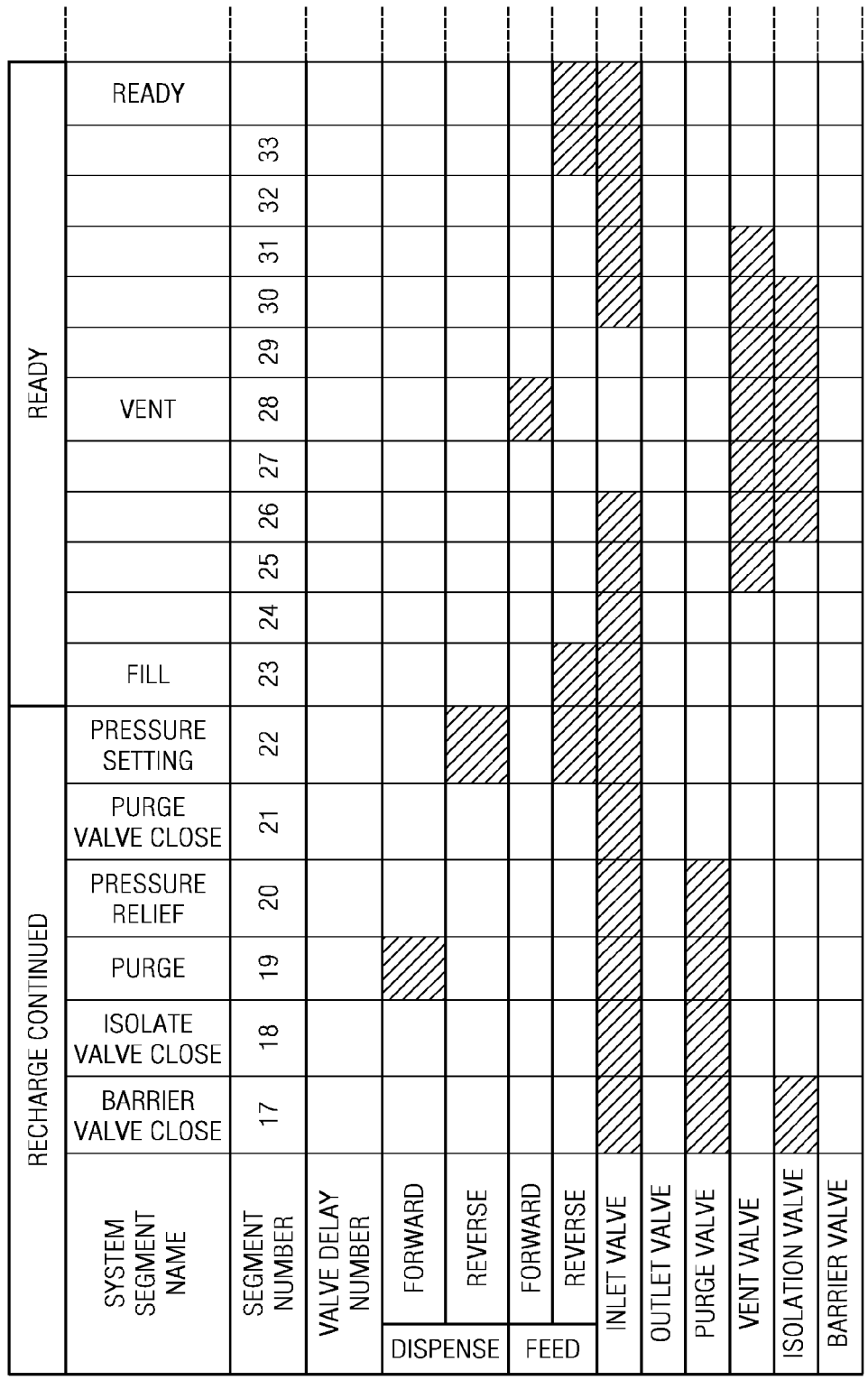

Referring briefly to FIG. 3, this figure provides a diagrammatic representation of valve and dispense motor timings for various segments of the operation of multi-stage pump 25 of FIG. 2. Other sequences are shown in FIGS. 4A-G. While several valves are shown as closing simultaneously during segment changes, the closing of valves can be timed slightly apart (e.g., 100 milliseconds) to reduce pressure spikes. For example, between the vent and purge segment, isolation valve 130 can be closed shortly before vent valve 145. It should be noted, however, other valve timings can be utilized in various embodiments. Additionally, several of the segments can be performed together (e.g., the fill/dispense stages can be performed at the same time, in which case both the inlet and outlet valves can be open in the dispense/fill segment). It should be further noted that specific segments do not have to be repeated for each cycle. For example, the purge and static purge segments may not be performed every cycle. Similarly, the vent segment may not be performed every cycle.

The opening and closing of various valves can cause pressure spikes in the fluid within multi-stage pump 25. Because outlet valve 147 is closed during the static purge segment, closing of purge valve 140 at the end of the static purge segment, for example, can cause a pressure increase in dispense chamber 185. This can occur because each valve may displace a small volume of fluid when it closes. More particularly, in many cases before a fluid is dispensed from chamber 185 a purge cycle and/or a static purge cycle is used to purge air from dispense chamber 185 in order to prevent sputtering or other perturbations in the dispense of the fluid from multi-stage pump 25. At the end of the static purge cycle, however, purge valve 140 closes in order to seal dispense chamber 185 in preparation for the start of the dispense. As purge valve 140 closes it forces a volume of extra fluid (approximately equal to the hold-up volume of purge valve 140) into dispense chamber 185, which, in turn, causes an increase in pressure of the fluid in dispense chamber 185 above the baseline pressure intended for the dispense of the fluid. This excess pressure (above the baseline) may cause problems with a subsequent dispense of fluid. These problems are exacerbated in low pressure applications, as the pressure increase caused by the closing of purge valve 140 may be a greater percentage of the baseline pressure desirable for dispense.

More specifically, because of the pressure increase that occurs due to the closing of purge valve 140 a "spitting" of fluid onto the wafer, a double dispense or other undesirable fluid dynamics may occur during the subsequent dispense segment if the pressure is not reduced. Additionally, as this pressure increase may not be constant during operation of multi-stage pump 25, these pressure increases may cause variations in the amount of fluid dispensed, or other characteristics of the dispense, during successive dispense segments. These variations in the dispense may in turn cause an increase in wafer scrap and rework of wafers. Various embodiments account for the pressure increase due to various valve closings within the system to achieve a desirable starting pressure for the beginning of the dispense segment, account for differing head pressures and other differences in equipment from system to system by allowing almost any baseline pressure to be achieved in dispense chamber 185 before a dispense.

In one embodiment, to account for unwanted pressure increases to the fluid in dispense chamber 185, during the static purge segment dispense motor 200 may be reversed to back out piston 192 a predetermined distance to compensate for any pressure increase caused by the closure of barrier valve 135, purge valve 140 and/or any other sources which may cause a pressure increase in dispense chamber 185.

Thus, embodiments described herein provide a multi-stage pump with gentle fluid handling characteristics. By compensating for pressure fluctuations in a dispense chamber before a dispense segment, potentially damaging pressure spikes can be avoided or mitigated. Embodiments of a multi-stage pump can also employ other pump control mechanisms and valve timings to help reduce deleterious effects of pressure on a process fluid.

Figure 5:
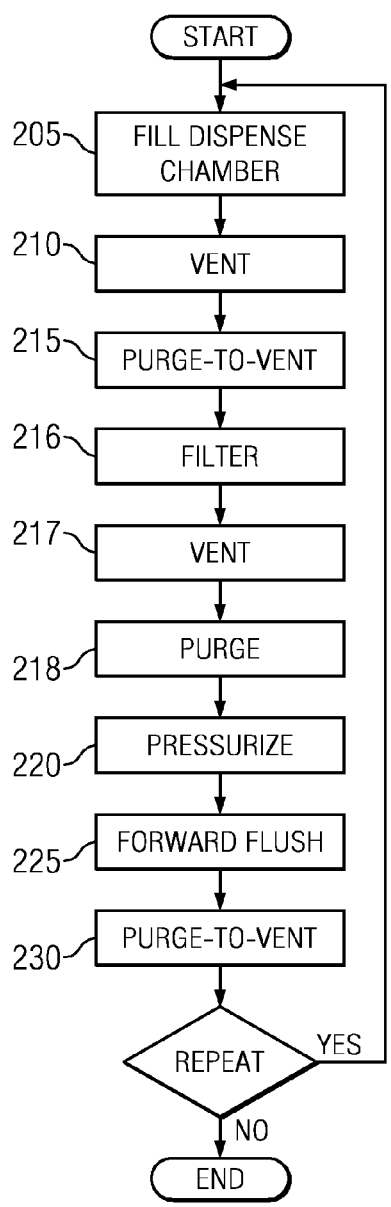
FIG. 5 is a flow chart illustrating one embodiment of a priming routine.

In addition to the dispense cycle, pump 25 may perform other operations. When a new filter is connected to a pump, the filter should be primed so that the filter membrane is fully wetted prior to running a dispense cycle. FIG. 5 provides an illustrative example of steps for a priming routine, however other priming routines can be used as would be understood by those of ordinary skill in the art. In step 205 fluid is introduced into the dispense chamber. In the next step, the filter can be vented as described above for a period of time to remove air from the upstream portion of the filter (step 210). Next, a purge-to-vent segment can occur (step 215). In this segment, the isolate and purge valves are opened and the barrier valve is closed. The dispense motor is run so that fluid flows out of the dispense chamber and through the vent. This can be followed by a filtration segment (step 216), a vent segment (step 217) and a purge segment (step 218). In the next segment, the filter can be pressurized (step 220). The barrier valve and vent valve can be closed, while the isolate valve is opened and the feed stage motor moved to pressurize the fluid. Next, a forward flush segment can occur in which fluid is run through the filter to the dispense chamber and purged out the purge valve (step 225). A purge-to-vent segment can occur again (step 230). The priming routine can be repeated as needed or desired.

While the foregoing provides an example priming routine, the priming routine can involve any number of different steps and to ensure that the filter membrane is fully wetted. Some non-limiting examples of sequences of segments that can be used in a priming routine include, but are not limited to: i) a fill segment, a vent segment; ii) a fill segment, a purge to vent segment, a filtration segment, a vent segment, a purge to inlet segment; iii) a dispense segment, a fill segment, a filtration segment and a purge segment. Additional or alternative segments can be used in priming routines as needed or desired.

Figure 6B:
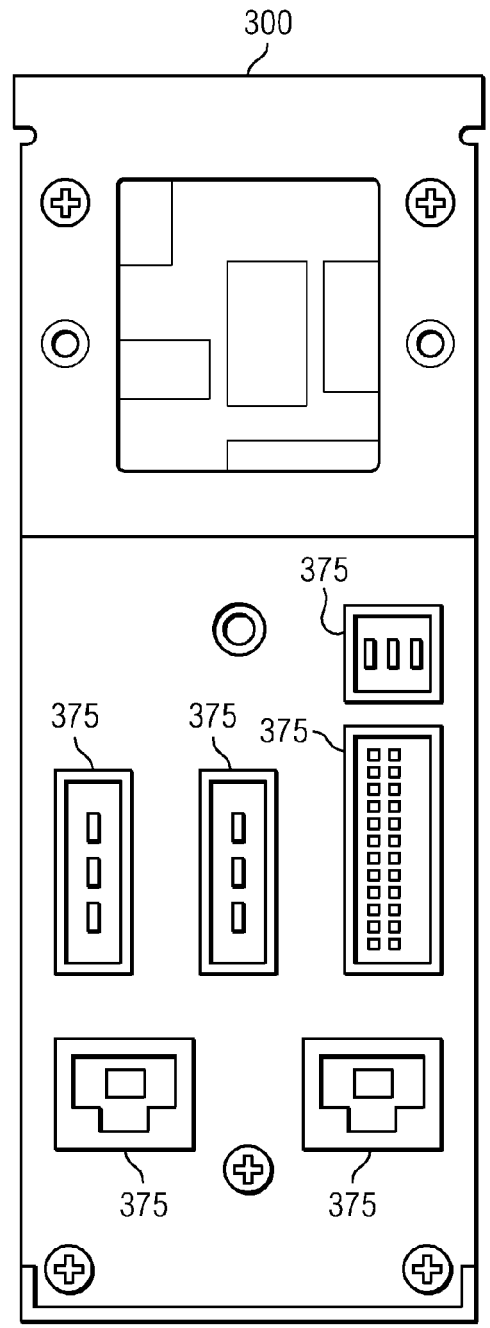
FIGS. 6A and 6B are diagrammatic representations of one embodiment of a pump.
Figure 6A:
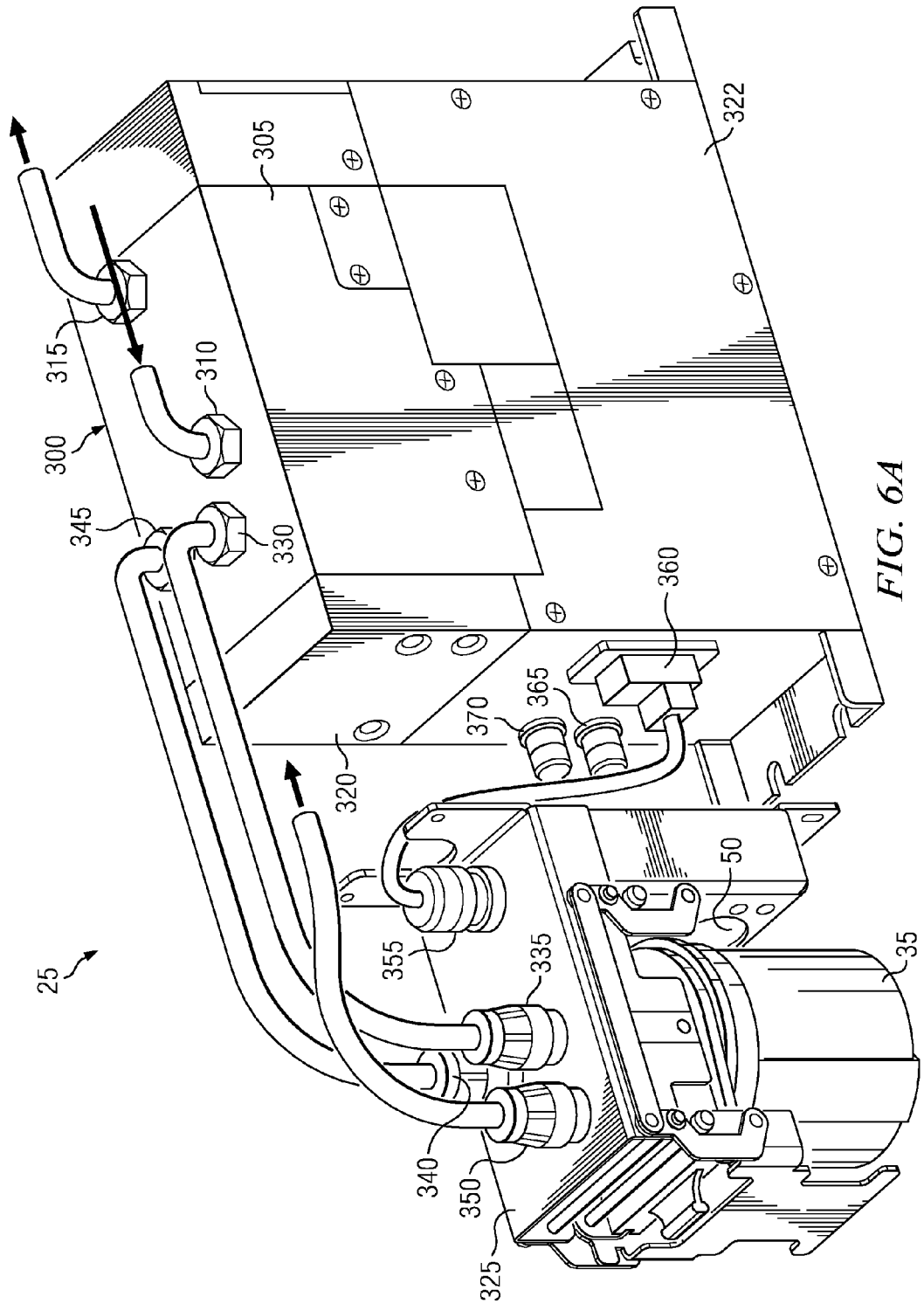

FIG. 6A is a diagrammatic representation of one embodiment of pump 25 having a pump main body 300 and a manifold 325. Pump 25 can include a dispense block 305 that at least partially defines the fill chamber, dispense chamber and portions of flow passages described above in conjunction with FIG. 2. Dispense block 305, according to one embodiment, can be a unitary block of PTFE, modified PTFE or other material. Because these materials do not react with or are minimally reactive with many process fluids, the use of these materials allows flow passages and pump chambers to be machined directly into dispense block 305 with a minimum of additional hardware.

Dispense block 305 can include various external inlets and outlets including, for example, inlet 310 through which the fluid is received and dispense outlet 315 through which fluid is dispensed during the dispense segment. Dispense block 305, in the example of FIG. 6A, does not include an external purge outlet as purged fluid can be routed back to the feed chamber. In other embodiments, however, fluid can be purged externally.

Figure 8:
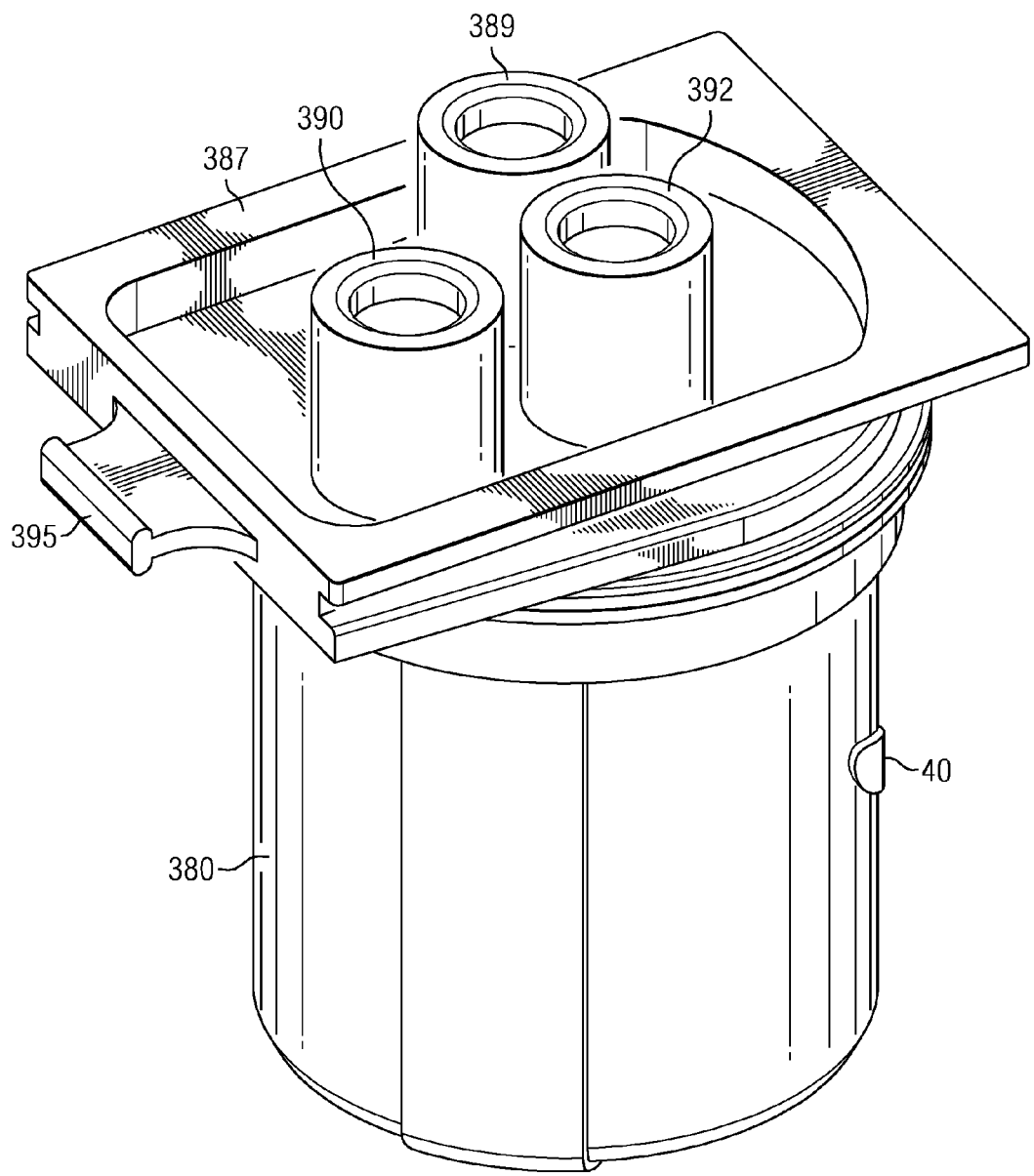
FIG. 8 is a diagrammatic representation of one embodiment of a filter.

A valve plate 320 can work in cooperation with dispense block 305 to form some or all of the valves of pump 25. One embodiment of a valve plate is illustrated in FIG. 8 below. In other embodiments, some or all of the valves can be external.

A cover 322 provides protection for various components of pump 25, including feed motor 175 and dispense motor 200. Cover 322 can also provide protection for pistons, pump controller 20, fluid lines, pneumatic lines and other components.

A manifold 325 provides a connection for filter 35. Filter 35 can connect to manifold 325 using any suitable mechanism, including, but not limited to the filter connections described in U.S. Provisional Patent Application No. 60/741,667, entitled "O-RING-LESS LOW PROFILE FITTING AND ASSEMBLY THEREOF" by Inventor Gashgaee, filed Dec. 2, 2005; and U.S. patent application Ser. No. 11/602,513, entitled "O-RING-LESS LOW PROFILE FITTINGS AND FITTING ASSEMBLIES" by Inventor Gashgaee, filed Nov. 20, 2006 now issued as U.S. Pat. No. 7,547,049 on Jun. 16, 2009; which are hereby fully incorporated by reference herein. Flow passages in manifold 325 can connect internally or externally to flow passages in dispense block 305. Manifold 325 can include an integrated tag reader 50 that is positioned to read a filter information tag on the filter.

According to one embodiment, an outlet 330 from dispense block 305 can be in fluid communication with an inlet 335 on manifold 325 and an outlet 340 from manifold 325 can be in fluid communication with an inlet 345 on dispense block 305 to complete a flow path for filter 35 connected to manifold 325. In the embodiment of FIG. 6A, manifold 325 can include a vent outlet 350 that can be in fluid communication with an external vent valve. Manifold 325 and the pump main body 300 can include connections 355 and 360 to allow integrated tag reader 50 to electrically connect to the pump controller.

Pump 25 can also include inlet 365 and outlet 370 that can connect to vacuum and pressure sources. According to one embodiment, selective application of vacuum or pressure can be used to open and close various valves defined by valve plate 320. FIG. 6B illustrates that pump 25 can include connections 375 for various communications links and power. Connections 375, according to one embodiment, can be configured so that pump 25 can hook into existing electrical tracks for pumps.

Figure 7:
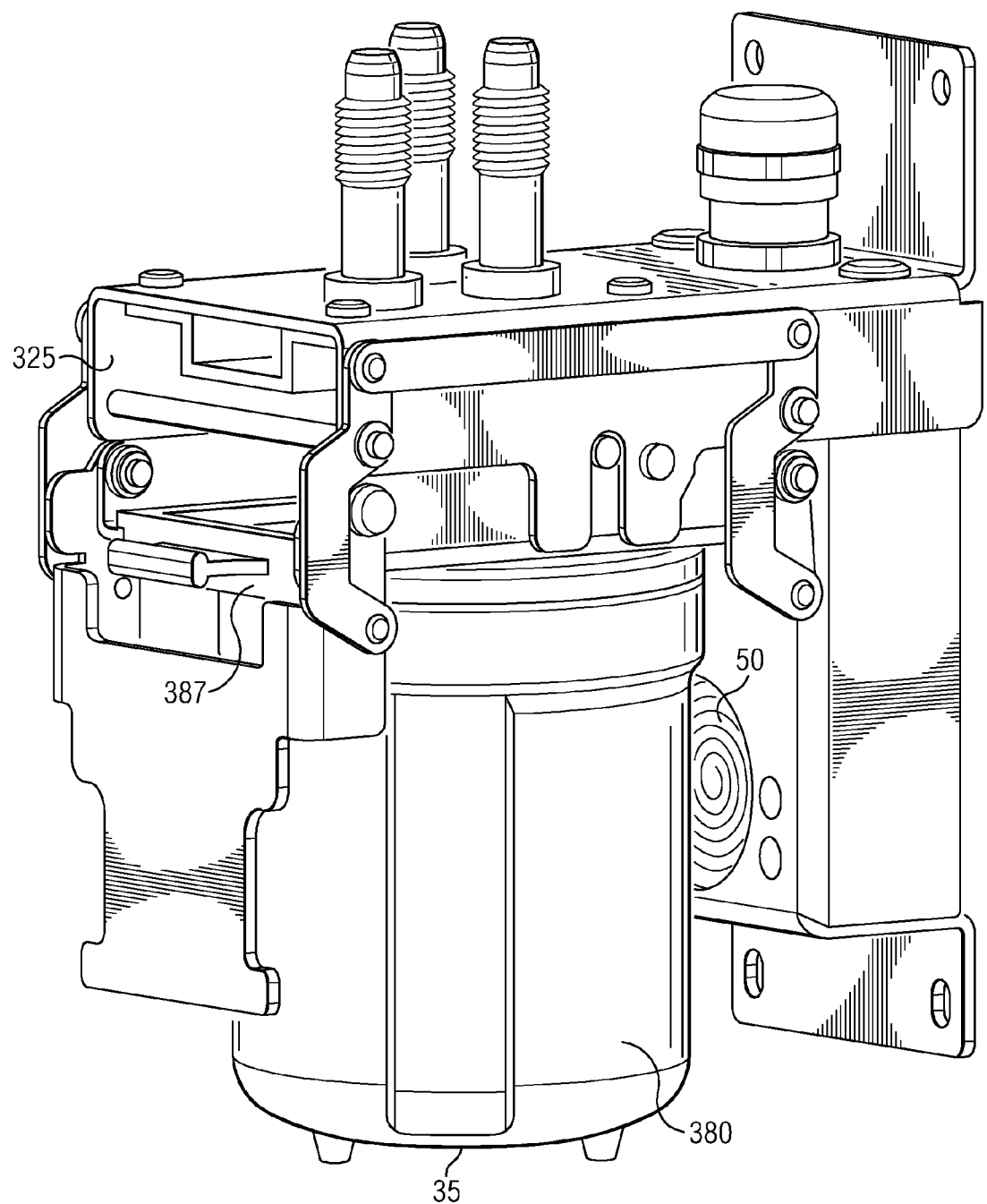
FIG. 7 is a diagrammatic representation of one embodiment of a filter and a manifold.

FIG. 7 is a diagrammatic representation of one embodiment of filter 35 connected to manifold 325. Manifold 325 can include a quick change mechanism 377 for filters to allow filters to be easily connected to or removed from manifold 325. Any quick change mechanism or other mechanism known or developed in the art for connecting a filter 35 to manifold 325 or to otherwise connect filter 35 to the pump can be used. One embodiment of a connection mechanism for a filter is described in PCT Patent Applicant No. PCT/US2008/082289 (Publication No. 2009/059324), filed Nov. 3, 2008, entitled "O-Ringless Seal Couplings", by Towle et al. which claims priority to United States Provisional Application No. 60/985,103, which are hereby fully incorporated by reference herein. According to one embodiment, filter 35 can include a bowl 380 and head 387. Bowl 380 can be shaped to accommodate a filter cartridge and head 387 can be shaped to accommodate a quick change mechanism of manifold 325. Tag reader 50 is positioned to read a filter information tag attached to or embedded in filter 35.

FIG. 8 illustrates one embodiment of filter 35. Head 387 can include an outlet port 389, vent port 390 and inlet port 392 that are sized and shaped to complement ports on manifold 325. O-rings can be disposed in outlet port 389, vent port 390 and inlet port 392 to prevent leaks. According to one embodiment, head 387 can include a filter information tag 40. For example, a RFID, Bluetooth, IR, other wireless protocol or other identification device can be placed on filter 35. The identification device can include manufacturer information about the filter (type of filter, retention rating, protocol for running the filter (by way of example, but not limitation, recipe variables, parameters, equations, curves for operations using the filter), priming/filling sequence for the filter pressure drop characteristics, flow rate, pore size or other information). Head 387 can be shaped and sized to allow insertion into a quick change out device of a pump. For ease of installation, head 387 can include a handle portion 395 that can include features to ease gripping by a robot or human. While filter information tag 40 is illustrated as attached to the side of filter 35, filter information tag 40 can also be coupled to filter 35 in other manners. For example, filter information tag 40 can be press fit in a tag receiving portion of bowl 380 or head 387. In other embodiment, filter information tag 40 can be embedded in material that forms head 387 or bowl 387. Filter information tag can be otherwise coupled to filter 35.

Figure 9:
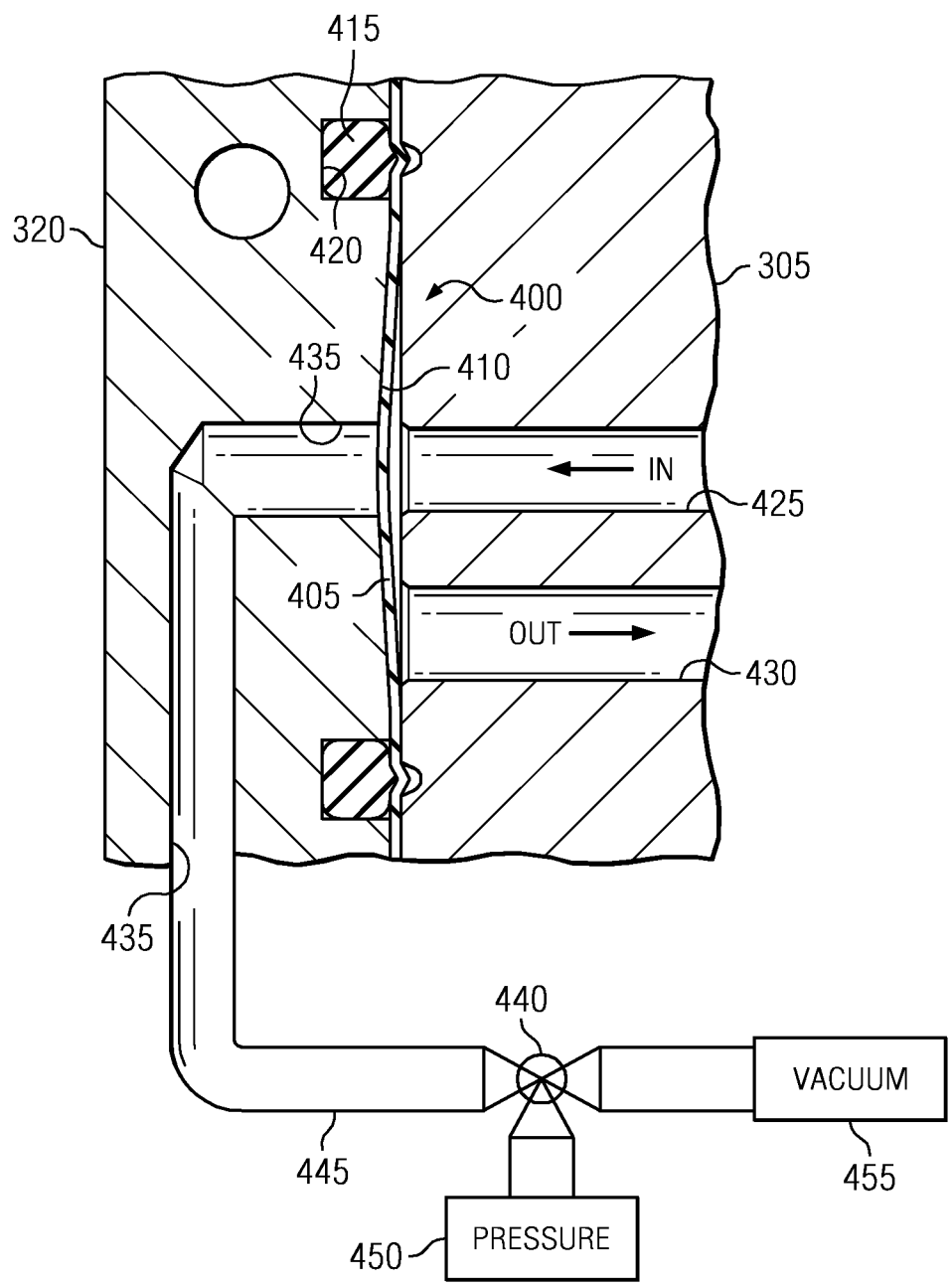
FIG. 9 is a diagrammatic representation of one embodiment of a valve assembly.

FIG. 9 is a diagrammatic representation of one embodiment of a valve assembly comprising dispense block 305 and valve plate 320 to form a valve 400. Valve plate 320 can provide a valve housing for a system of valves including one or more of inlet valve 125, isolation valve 130, barrier valve 135 and purge valve 140. According to one embodiment, each valve is at least partially integrated into valve plate 320 and is a diaphragm valve that is either opened or closed depending on whether pressure or vacuum is applied to the corresponding diaphragm. In other embodiments, some of the valves may be external to dispense block 305, arranged in additional valve plates or otherwise provided.

According to one embodiment, a sheet of material 405 is sandwiched between valve plate 320 and dispense block 305 to form the diaphragms of the various valves. According to one embodiment material 305 can be a sheet of PTFE or other flexible material. Valve plate 320 forms a valve seat 410 into which material 405 can move. According to one embodiment, valve seat 410 has a shape to which material 405 can contour without leaving dead space. An O-ring 415 can be disposed in an annular groove 420 around the edge of each valve. O-ring 415 can be disposed on the valve plate side, dispense block side or O-rings can be disposed on both sides. Fluid can flow into and out of valve 400 through fluid flow passage 425 and 430. Flow passages 425 and 430 can be placed and sized as needed or desired. According to one embodiment, valve plate 320 can be configured to reduce the hold-up volume of the valve, eliminate volume variations due to vacuum fluctuations, reduce vacuum requirements and reduce stress on the valve diaphragm. Example valve configurations are described in U.S. patent application Ser. No. 11/602,464 entitled "SYSTEM AND METHOD FOR A PUMP WITH REDUCED FORM FACTOR" by inventors Cedrone et al, filed Nov. 20, 2006; and U.S. patent application Ser. No. 12/218,325 entitled "METHOD AND SYSTEM FOR HIGH VISCOSITY PUMP" by inventors Cedrone et al, filed Jul. 14, 2008; which are hereby fully incorporated by reference herein Valve plate 320 can include a valve control inlet 435 for each valve to apply pressure or vacuum to the corresponding diaphragm or portion of a diaphragm. By the selective application of pressure or vacuum to the inlets, the corresponding valves are opened and closed so that fluid flow from inlet 425 to outlet 430 is restricted or allowed. According to one embodiment, the application of pressure or vacuum can be regulated by a solenoid valve 440 that either opens valve control supply line 445 to pressure from a pressure source 450 or vacuum from a vacuum source 455.

Figure 10:
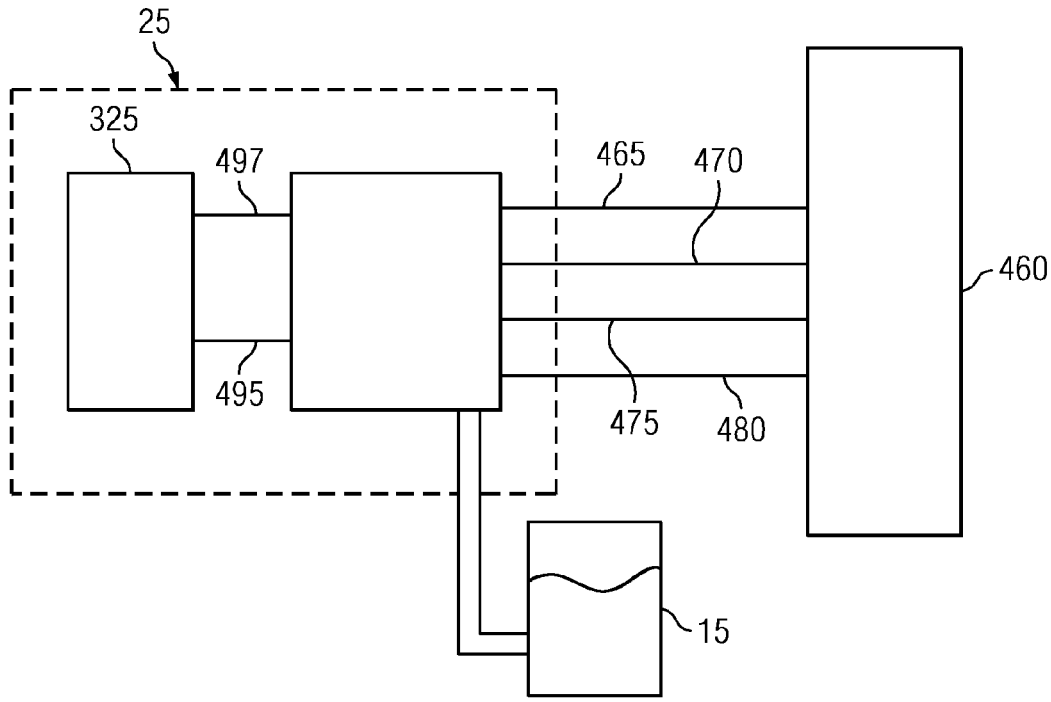
FIG. 10 is a diagrammatic representation of one embodiment of a pump and connections.

FIG. 10 is a diagrammatic representation of one embodiment of pump 25 and connections to other components. In the embodiment of FIG. 10, pump 25 includes an on-board pump controller that can be connected to pump track 460. Pump track 460 can allow multiple pumps to be set up in a compact space and can provide connections for I/O signals (represented at 465), serial communications (represented at 470) and electrical connections (represented at 475). Track 460 can also provide pneumatic connections for pressure/vacuum used to open and close valves (represented at 480).

The inlet of pump 25 can be connected to a fluid supply, such as resist bottle or other fluid supply 15. The output of pump 25 can be connected to a stop and suckback valve between the outlet of pump 25 and the wafer. Pump 25 can include internal or external fluid connections (represented at 495) between manifold 325 and other portions of pump 25. Additionally, pump 25 can include electrical connections (represented at 497) between the tag reader of manifold 325 and the pump controller or other electronics of pump 25.

Figure 11:
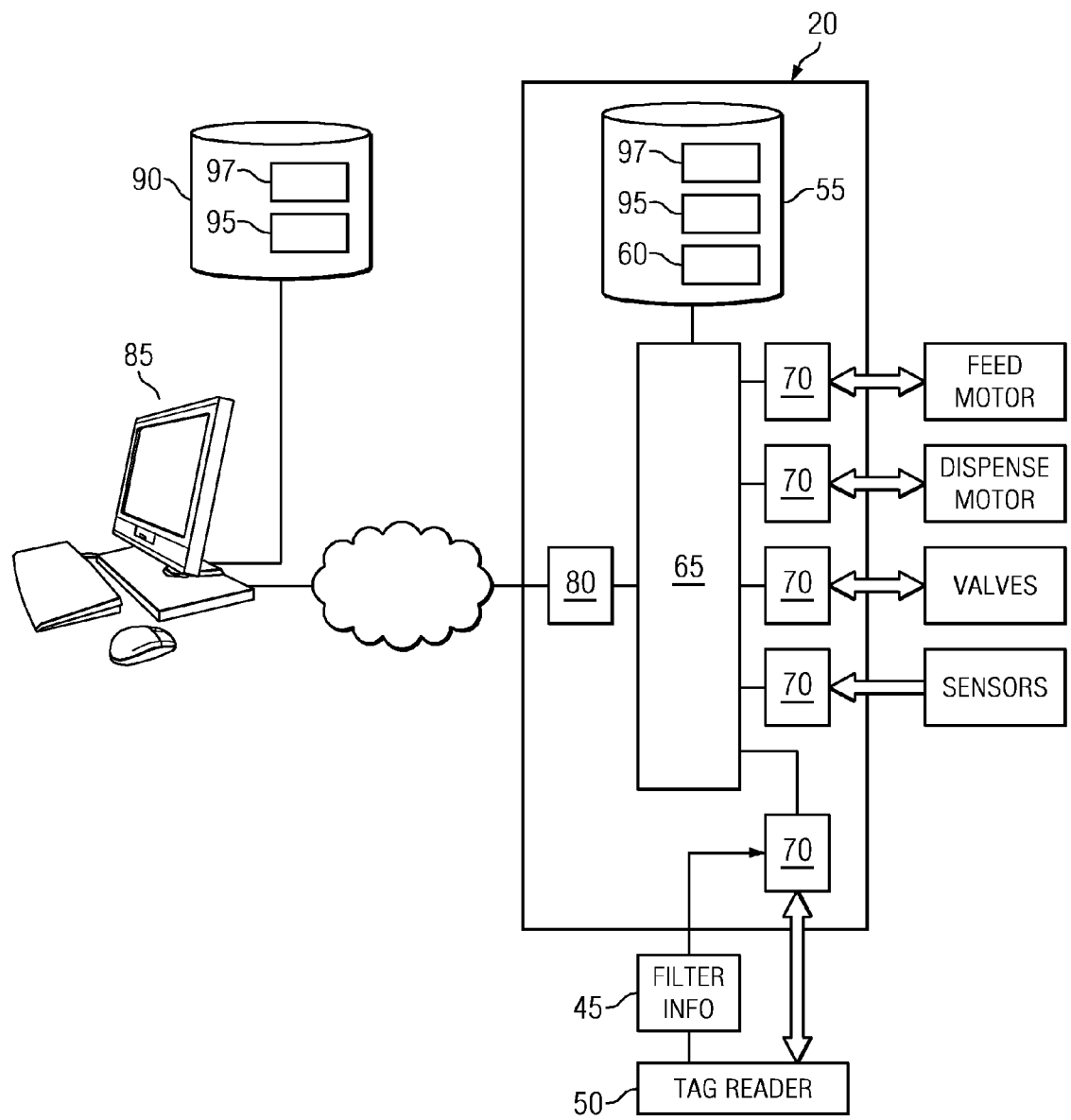
FIG. 11 is a diagrammatic representation of one embodiment of a system for controlling operation of a pump.

FIG. 11 is a diagrammatic representation of one embodiment of a system for controlling the operation of pump 25. Pump controller 20 can be onboard pump 25 or connected to pump 25 via one or more communications links for communicating control signals, data or other information. Pump controller 20 can be implemented as an onboard PCB board, remote controller or in other suitable manner. Additionally, the functionality of pump controller 20 can be distributed between an onboard controller and another controller.

According to one embodiment, pump controller 20 can include a computer readable medium 55 (e.g., RAM, ROM, Flash memory, optical disk, magnetic drive or other computer readable medium) containing a set of control instructions 60 for controlling the operation of multi-stage pump 20. A processor 65 (e.g., CPU, ASIC, RISC, DSP or other processor) can execute the instructions. One example of a processor is the Texas Instruments TMS320F2812PGFA 16-bit DSP (Texas Instruments is Dallas, Tex. based company). In another embodiment, instructions 60 can be implemented as hardware. Additionally, pump controller 20 can include a variety of computer components known in the art including additional processors, memories, interfaces, display devices, peripherals or other computer components not shown for the sake of simplicity.

A set of interfaces 70 can allow pump controller 20 to communicate serial, parallel or analog data/signals to motors, valves or other components and receive data/signals from sensors, tag reader 50, controllers or other components of pump 25. For example, pump controller 20 can send signals to feed motor 175 (see FIG. 2), dispense motor 200 (see FIG. 2), solenoids to control solenoid valves 840 (see FIG. 9) and other components of pump 25. Pump controller 20 can generate signals to directly control components or can generate signals that are interpreted by valve, motor or other controllers to operate components of pump 25. Pump controller 20 can also receive analog or digital signals from sensors, such as pressure sensor 112 (see FIG. 2), tag reader 50 and other components of pump 25. Interfaces 70 can include analog and digital interfaces as needed and there may be additional components between interfaces 70 and processor 65, such as, but not limited to, analog to digital converters, filters and other signal processing components.

According to one embodiment, pump controller 20 can also include an interface 80 to connect to a pump management system. Interface 80 can allow pump controller 20 to connect to a network (e.g., Ethernet, wireless network, global area network, DeviceNet network or other network known or developed in the art), a bus (e.g., SCSI bus) or other communications link. An I/O interface connector can be used to connect pump controller 20 to a variety of interfaces and manufacturing tools. Example I/O interface connectors can be found in United States Provisional Patent Application No. 60/741,657, entitled "I/O INTERFACE SYSTEM AND METHOD FOR A PUMP," by Cedrone et al., filed Dec. 2, 2005; and U.S. patent application Ser. No. 11/602,449, entitled "I/O SYSTEMS, METHODS AND DEVICES FOR INTERFACING A PUMP CONTROLLER," by Cedrone et al., filed Nov. 20, 2006; which are hereby fully incorporated by reference herein.

Pump controller 20 can connect to a pump management system 85 that can provide instructions to pump controller 20 on the operation of pump 25. Pump management system 85 can be a computer or network of computers that connect to pump controller 20 to provide dispense recipes or other information to pump controller 20. Pump management system 85 can also collect operational data from pump controller 20. Pump management system 85 can connect to multiple pumps to provide centralized control and data collection. According to one embodiment, pump management system 85 can maintain a data repository 90 of operational data 97 collected from a number of pumps. Data repository can be a database, file system or other data storage system.

In operation, pump controller 20 can receive filter information 45 from tag reader 50. Pump controller 20 can execute instructions 60 to analyze information 45 and determine whether or how to operate pump 25. According to one embodiment, pump controller 20 can apply rules to information 45. As one example, pump controller 20 can compare information 45 to stored information 95 to determine whether to operate the pump. By way of example, but not limitation, this can include comparing a part number to an expected part number to determine if the filter is acceptable to be used with pump 25. Additionally, if the filter is acceptable, pump controller 20 can determine how to operate pump 25 based on filter information 45. In another embodiment, pump controller 20 can send filter information 45 to pump management system 85 and pump management system 85 can apply rules to determine whether or how to operate pump 25.

Stored information 95 can be provided to pump controller 20 through a user interface, by pump management system 85 or other can be otherwise provided. In one embodiment, pump controller 20 can store information 95 from a particular filter. If, for example, it is known that the first filter used with pump 25 is the proper filter, pump controller 20 can store filter information 45 from this filter as stored information 95.

Pump controller 20 can also store operational data 97 and correlate the operational data 97 to filter information 45. In another embodiment, pump controller 20 can forward operational data 97 to pump management system 85 and pump management system 85 can correlate the operational data 97 to filter information 45.

Analysis of the operational data versus various filter characteristics can be used to heuristically update the rules for determining whether and how to operate pump 25. For example, pump controller 20 may initially apply a rule such that a filter having a particular part number is acceptable. However, if over time it is discovered that filters having that part number and a first range of membrane bubble points resulted in good dispenses, but filters having the same part number and a second range of membrane bubble points resulted in an increased number of bad dispenses, the pump controller 20 or pump management system 85 can update the rules such that pump controller 20 will not operate with a filter having a membrane bubble point in the second range of membrane bubble points, even if the filter has an acceptable part number. Thus, analysis of data can be used to update the decision making of pump controller 20 or pump management system 85.

Figure 12:
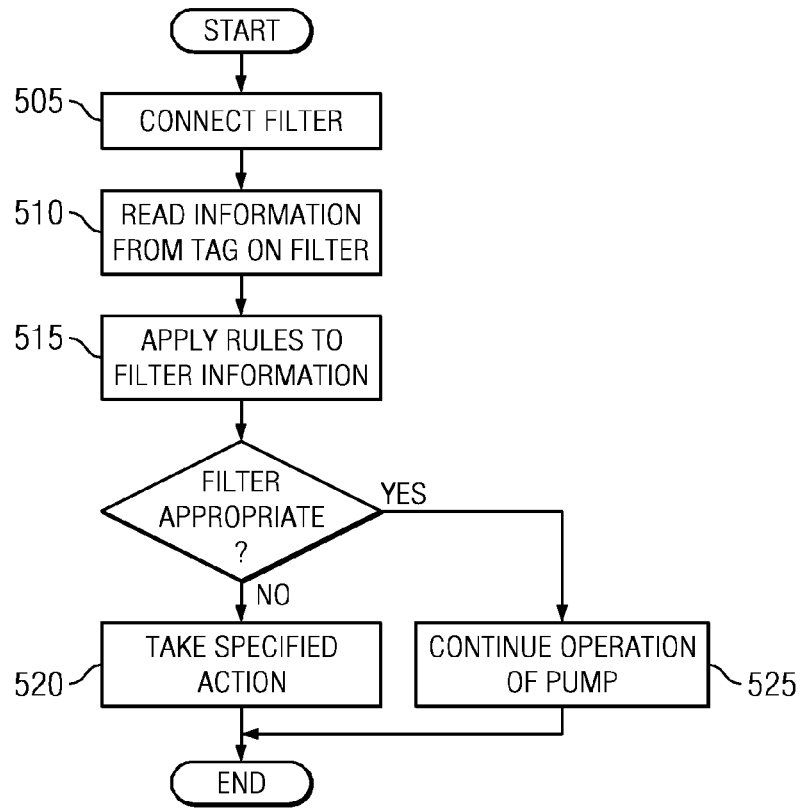
FIG. 12 is a flow chart illustrating of one embodiment of a method for affecting the operation of a pump using a filter information tag.

FIG. 12 is a diagrammatic representation of one embodiment of a method for controlling the operation of a pump based on filter information. Various processing steps in FIG. 12 can be performed by pump controller 20, pump management system 85 or other device. When a new filter is connected to a pump (step 505), an electronic tag reader can read a set of filter information from the tag (step 510). A set of rules can be applied to the filter information to determine if the filter is appropriate (step 515). The rules for determining whether a filter is appropriate can depend on the filter information and other factors, such as the process fluid, environmental properties, required cycle time or other factors. For example, a rule may be applied such that, if the process fluid has a certain viscosity, a filter will only be considered appropriate if it has a specific part number or certain part number and bubble point. Thus, the rules applied can depend on multiple pieces of filter information and other information. If the filter is not an appropriate filter, a corresponding action can be taken (step 520). Otherwise, operation of the pump can proceed (step 525).

According to one embodiment, a filter part number can be compared to an expected or allowable part number to determine if the part number matches (step 515). If the part number matches, operation of the pump can proceed (step 525). If the part number does not match, the pump controller (or other device) can determine that operation of the pump should not proceed (step 520). An alarm or notification can be generated to notify a pump management system or human user that the filter connected to the pump is not appropriate. The steps of FIG. 12 can be repeated as needed or desired. If the filter is appropriate for a dispense operation, the filter information can be used to determine the operating routine of the pump.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the disclosure. For example, while the foregoing primarily uses the example of a multi-stage pump, embodiments described herein can also be used with a single stage pump or other pumps. It is to be understood that the forms of the disclosure shown and described herein are to be taken as the presently preferred embodiments. Elements and materials may be substituted for those illustrated and described herein, parts and processes may be reversed, and certain features of the disclosure may be utilized independently, all as would be apparent to one skilled in the art after having the benefit of this description of the disclosure. Changes may be made in the elements described herein without departing from the spirit and scope of the disclosure as described in the following claims.

What is claimed is:

1. A pump comprising:
   one or more motors to draw fluid into an inlet of the pump and dispense fluid from an outlet of the pump;
   a connection for a removable filter so that the removable filter can be placed in a fluid flow path between the pump inlet and the pump outlet;
   an electronic tag reader positioned and configured to read filter information for the removable filter from an electronic tag on the removable filter when the removable filter is connected to the pump;
   a pump controller configured to:
      receive filter information for the removable filter from the electronic tag reader; and
      apply one or more rules to the filter information to determine if the removable filter connected to the pump is an appropriate filter and, if the filter is appropriate, to determine further operation of the pump including how to prime the removable filter connected to the pump in preparation for dispense cycles.

2. The pump of claim 1, wherein the pump controller is further operable to access a first priming routine associated with a first filter type and a second priming routine associated with a second filter type, wherein the pump controller is configured to apply the one or more rules to the filter information for the removable filter to prime the removable filter connected to the pump according to the first priming routine or the second priming routine depending on whether the removable filter is the first filter type or the second filter type.

3. The pump of claim 1, wherein the electronic tag reader comprises an RFID reader.

4. The pump of claim 1, wherein the filter information comprises a part number.

5. The pump of claim 4, wherein applying the one or more rules further comprises comparing a received part number for the removable filter connected to the pump to an expected part number to determine whether to prime the removable filter connected to the pump.

6. The pump of claim 1, wherein the connection comprises a quick change mechanism for connecting the removable filter to the pump.

7. A pump comprising:
   one or more motors to draw fluid into an inlet of the pump and dispense fluid from an outlet of the pump;
   a removable filter in a fluid flow path between the pump inlet and the pump outlet, the removable filter having an electronic tag storing filter information for the removable filter;
   an electronic tag reader positioned and configured to read the filter information from the electronic tag;
   a pump controller coupled to the electronic tag reader, the pump controller configured to:
      receive filter information for the removable filter from the electronic tag reader; and
      apply one or more rules to the filter information to determine if the removable filter connected to the pump is an appropriate filter and, if the removable filter is appropriate, to determine further operation of the pump including how to prime the removable filter connected to the pump in preparation for dispense cycles.

8. The pump of claim 7, wherein the pump controller is further configured to access a first priming routine associated with a first filter type and a second priming routine associated with a second filter type, wherein the pump controller is configured to apply the one or more rules to the filter information to prime the removable filter according to the first priming routine or the second priming routine depending on whether the removable filter is of the first filter type or the second filter type.

9. The pump of claim 7, wherein the electronic tag reader comprises an RFID reader and the electronic tag comprises an RFID tag.

10. The pump of claim 7, wherein the filter information comprises a part number.

11. The pump of claim 10, wherein the applying the one or more rules further comprises comparing a received part number for the removable filter to an expected part number to determine whether to prime the removable filter.

12. The pump of claim 7, wherein the pump controller is configured to apply the one or more rules to information specific to the removable filter to determine further operation of the pump.

13. A method of controlling operation of a pump comprising:
   connecting a removable filter having an electronic tag storing filter information for the filter to a pump;
   reading the filter information for the filter from the electronic tag with an electronic tag reader;
   communicating the filter information for the filter from the electronic tag reader to a pump controller coupled to the electronic tag reader; and
   applying one or more rules to the filter information to determine if the removable filter connected to the pump is an appropriate filter and, if the removable filter is appropriate, to determine further operation of the pump including how to prime the removable filter connected to the pump in preparation for dispense cycles.

14. The method of claim 13, further comprising storing a first priming routine associated with a first filter type and a second priming routine associated with a second filter type, wherein the one or more rules are applied by to select from the first priming routine or second priming routine depending on whether the filter is of the first filter type or the second filter type.

15. The method of claim 13, wherein the one or more rules are applied by a system in communication with the pump controller.

16. The method of claim 13, wherein the tag is an RFID tag and the electronic tag reader is an RFID reader.

17. The method of claim 13, wherein applying one or more rules to the filter information comprises comparing a part number in the filter information to an expected part number to determine if the part number in the filter information matches the expected part number.

* * * * *

UNITED STATES PATENT AND TRADEMARK OFFICE
CERTIFICATE OF CORRECTION

| | | |
|---|---|---|
| PATENT NO. | : 8,684,705 B2 | Page 1 of 1 |
| APPLICATION NO. | : 12/714126 | |
| DATED | : April 1, 2014 | |
| INVENTOR(S) | : Magoon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 454 days.

Signed and Sealed this
Twenty-first Day of July, 2015

Michelle K. Lee
*Director of the United States Patent and Trademark Office*